(12) United States Patent
Deng et al.

(10) Patent No.: US 8,983,185 B2
(45) Date of Patent: Mar. 17, 2015

(54) IMAGE COMPRESSION

(71) Applicant: Canon Kabushiki Kaisha, Tokyo (JP)

(72) Inventors: Dixon De Sheng Deng, East Ryde (AU); Wen Tao Lu, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 13/828,710

(22) Filed: Mar. 14, 2013

(65) Prior Publication Data

US 2013/0251256 A1 Sep. 26, 2013

(30) Foreign Application Priority Data

Mar. 21, 2012 (AU) ................................ 2012201684

(51) Int. Cl.
*G06K 9/36* (2006.01)
*G06T 9/00* (2006.01)

(52) U.S. Cl.
CPC ........................................ *G06T 9/00* (2013.01)
USPC ............ 382/166; 382/162; 382/164; 382/165; 382/167

(58) Field of Classification Search
CPC ......... G06T 1/00; G06T 9/00; G06T 2200/00; G06T 2201/00
USPC ......... 382/162, 164, 165, 166, 167, 170, 181, 382/232, 234, 262; 348/597, 607, 240.1, 348/222.1, E5.031; 358/1.15, 518
See application file for complete search history.

(56) References Cited

U.S. PATENT DOCUMENTS

| 6,330,363 | B1 | 12/2001 | Accad |
| 6,804,401 | B2 | 10/2004 | Nelson et al. |
| 6,879,717 | B2 * | 4/2005 | Aggarwal et al. .............. 382/167 |
| 7,457,462 | B2 * | 11/2008 | Aggarwal et al. .............. 382/167 |
| 7,676,086 | B2 * | 3/2010 | Aggarwal et al. .............. 382/167 |

* cited by examiner

*Primary Examiner* — Anh Do
(74) *Attorney, Agent, or Firm* — Canon U.S.A., Inc. IP Division

(57) ABSTRACT

Disclosed is a method of compressing an image to be stored in a memory to satisfy a memory requirement. A size of a region having a uniform colour in the image is determined. The determined size of the region is compared with the candidate values of the region size threshold. A value is selected from the candidate values as the region size threshold based on the comparison between the estimated data amounts to satisfy the region size threshold and the memory requirement. The edges constituting the region which satisfy the selected value of the region size threshold are compressed losslessly.

20 Claims, 23 Drawing Sheets

IMAGE COMPRESSION

REFERENCE TO RELATED PATENT APPLICATION(S)

This application claims the benefit under 35 U.S.C. §119 of the filing date of Australian Patent Application No. 2012201684, filed on 21 Mar. 2012, hereby incorporated by reference in its entirety as if fully set forth herein.

TECHNICAL FIELD

The present invention relates to image processing and, in particular, to a method and apparatus for compressing images. The present invention also relates to a computer program product including a computer readable medium having recorded thereon a computer program for compressing images.

BACKGROUND

Many computer systems are required to process large amounts of image or bitmap data. Such computer systems are frequently operating with restricted memory resources, and as such, these computer systems often compress data to reduce the amount of memory required during processing.

One example of such a computer system is a Raster Image Processing System. A Raster Image Processor (RIP) takes the digital information about fonts and graphics that describes the appearance of a document and translates the information into an image composed of individual pixels that the imaging device such as a printer can output. A number of types of Raster Image Processors are known in the art. These include frame-store RIP's, band-store RIP's and tile-order RIP's.

In the tile RIP, the page is divided up into square tiles. Each tile is fully rendered before the RIP starts rendering the next tile. With such a RIP, an output compressor may start compression of a rendered tile as soon as it is available, provided that the compressor can accept data in tile order.

When choosing a compression method, it is important to use a method that is appropriate for the type of data being compressed. These methods can broadly be categorized as either lossy or lossless.

A hybrid compression strategy that utilises both lossless and lossy compression algorithms is often used to compress the output of a Raster Image Processor, in which the rendered bitmap is segmented into flat regions and image regions. In general, this is a successful strategy in achieving high image quality while maintaining a reasonable compression ratio. However, in a system where memory resource is scarce, adjustments need to be made to the compression strategy in order to achieve compression to within a target memory size (or allowable memory capacity).

For example, in a typical JPEG compression process, the DCT coefficients are quantized using a quantization table, which can be used to control the size of the final coded image. The higher the quantisation level, the more perceptible information is lost during the quantisation.

A hybrid strategy that employs JPEG as its lossy compression algorithm can adjust its lossy compression ratio by adjusting the quantisation level. If the initial compression fails to satisfy the target memory, then a recompression with a higher quantisation level is needed. However, it is hard to predict the memory saving that can be achieved by setting a certain quantisation level. Therefore, more than one attempt of recompression is needed by adjusting the quantisation level incrementally each time, until reaching the level that is appropriate for a given target memory.

Another method of controlling the size of an encoded image is to discard the image's DCT coefficients, starting from the highest order coefficient and stopping once a desired target memory is reached. This is feasible because the majority of the visual information in the image is encoded within the DC and lower AC coefficients.

A method of spectral JPEG encoding of images can be used, in which higher order AC coefficients can be deleted without the need for recompression. For each DCT coding block, the quantised coefficients are stored within spectral bands of decreasing visual significance. The increasing order of the DCT coefficients is directly related to their decreasing impact on the visual quality of the image. Hence the encoded DCT coefficients can be grouped into spectral partitions that are sorted by decreasing relevance to the overall image quality. In this arrangement, the image quality can be degraded as little as necessary through the deletion of the higher spectral partitions and their associated encoded DCT coefficients. In this way it is possible to reclaim memory adaptively, by removing the less relevant partitions first, and there is no need for recompression. Furthermore, to reduce the size of the losslessly-compressed data, the processor re-segments the image by setting a more aggressive region segmentation parameter, so that more regions can be classified as image regions in the recompression process.

One method for classifying more regions as image regions dynamically adjusts both compression and segmentation parameters to maintain the instant compression ratio within a tolerance interval. The method recompresses the document strip by strip till the overall compression ratio meets the requirement. However, adjusting the compression and segmentation parameters strip by strip can lead to inconsistent quality throughout the page. Having a recompression decision based on an instant compression ratio instead of the final overall compression ratio can lead to premature optimization and cause unnecessary quality loss. Most of all, the entire image can potentially be recompressed more than once, as it is hard to determine the memory saving that can be achieved by adjusting such a parameter before recompression occurs.

Another method discloses a block-based hybrid compression system, whereby the compression ratio is controlled by adjusting the threshold used in classifying the blocks as solid or image. A mapping between the number of solid blocks and a value of the classification threshold is stored. Each point in the mapping indicates the number of blocks that can be classified as solid if such a classification threshold value is chosen. This information gives a rough indication of the compression ratio for a given classification threshold value, which is then used to adjust the threshold value when recompression is needed. However, a compression ratio cannot be accurately predicted simply by using the number of solid blocks, which means that an attempted recompression may fail to meet the desired compression ratio. Other methods for reducing memory usage in the case when recompression fails to meet the desired compression ratio include image decimation, increased quantisation step size or selective quantisation for darker regions. The disadvantage of these other methods is the requirement for additional rounds of recompression that must be performed when that happens, till the desired compression ratio is met.

SUMMARY

It is an object of the present invention to substantially overcome, or at least ameliorate, one or more disadvantages of existing arrangements.

Disclosed are arrangements, referred to as Single Pass Recompression (SPR) arrangements which seek to address the above problems by, if a memory capacity (or target memory size) is exceeded in an initial compression, determining a target recompression size, and depending thereon, changing the mix of edge data compression and image data compression methods to thereby perform only one more compression in order to achieve the target memory utilisation.

According to an aspect of the present invention, there is provided a method of compressing an image to be stored in a memory to satisfy a memory requirement, said method comprising the steps of:

determining a size of a region in the image, the region having a uniform colour;

obtaining candidate values of a region size threshold;

comparing the determined size of the region with at least one of the candidate values of the region size threshold;

estimating data amounts to encode edges constituting the region which satisfies the at least one of the candidate values of the region size threshold;

selecting a value from the candidate values as the region size threshold based on the comparison between the estimated data amounts and the memory requirement;

compressing losslessly edges constituting the region which satisfies the selected value of the region size threshold; and compressing lossily image data in a region other than the region to be compressed losslessly.

BRIEF DESCRIPTION OF THE DRAWINGS

One or more embodiments of the invention will now be described with reference to the following drawings, in which:

FIG. 13b shows an alternative representation of how the edge metadata is stored in the Recompression Manager for the same example depicted in FIG. 13a;

DETAILED DESCRIPTION INCLUDING BEST MODE

Figure 1:
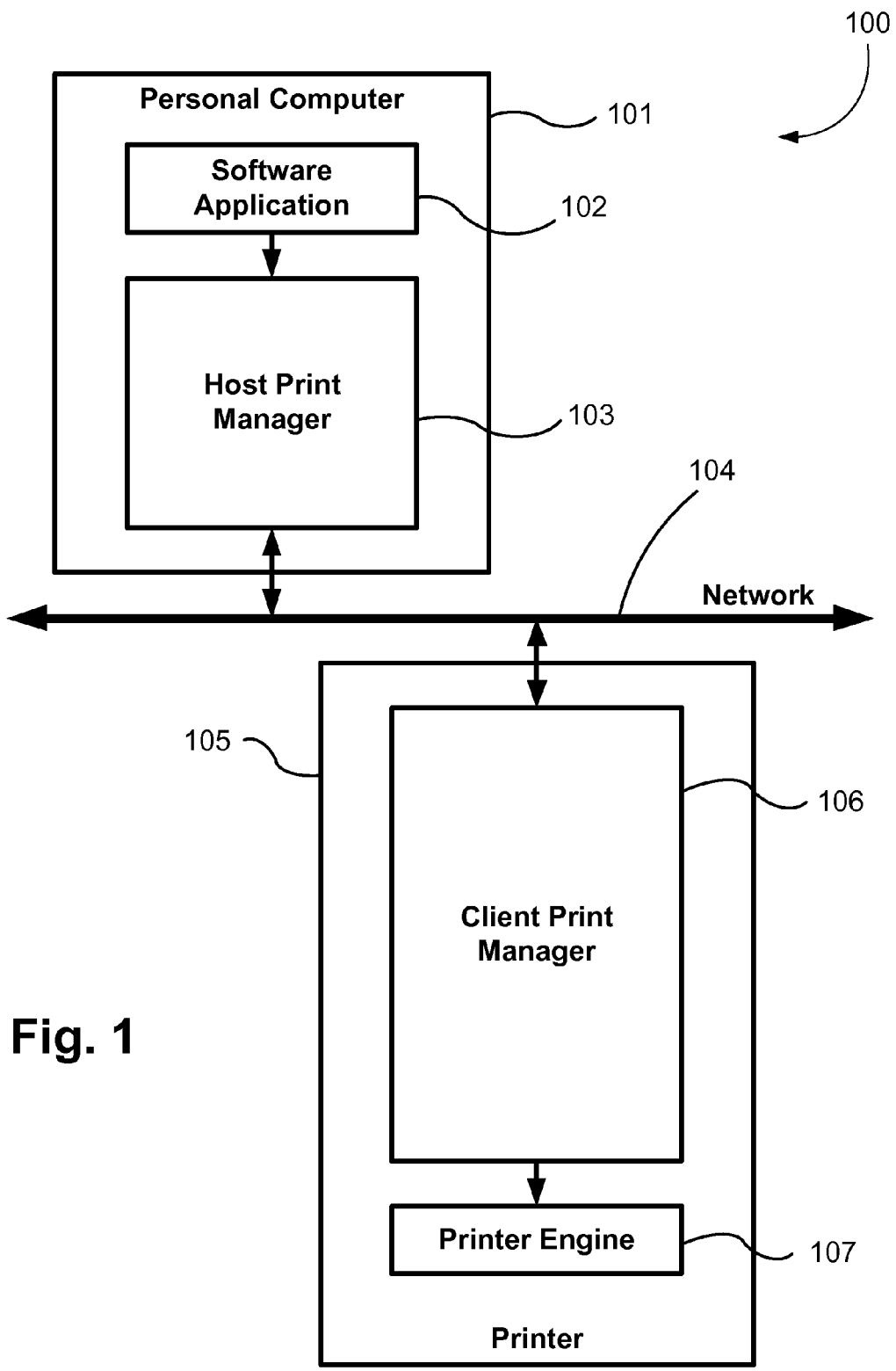
FIG. 1 shows a schematic block diagram of a printing system for rendering and printing a document.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of arrangements which may form public knowledge through their respective use. Such discussions should not be interpreted as a representation by the inventors or the present patent applicant that such arrangements in any way form part of the common general knowledge in the art.

Since data recompression is computationally intensive, it is advantageous to determine the appropriate recompression parameters which guarantee that the resulting compressed data meets the memory requirement (allowable memory capacity) in one pass, whilst optimizing image quality. The disclosed SPR arrangement solves the problem of how to determine such recompression parameters in a hybrid compression system.

The principles of the arrangements described herein have general applicability to image compression. For ease of explanation the arrangements are described with reference to image compression used in a colour raster image processing system. However, it is not intended that the SPR arrangements be limited to the described arrangements. For example, the SPR arrangement may have application to any arrangement utilising compression where memory resources are limited.

For natural images, lossy compression algorithms such as JPEG and wavelet compression can achieve high compression ratios and acceptable visual quality by discarding information that is not visually significant. However, documents containing sharp transitions in colour such as text or graphics can suffer, if information is discarded, from the introduction of visible artefacts.

The advantage of lossless compression is that the output is of high quality. This is important for text and graphic regions where sharp transitions in colour must be maintained and the sort of artefacts caused by most lossy algorithms can be avoided. Pixel-based lossless methods such as JPEG-LS do not scale well, because as resolution and colour depth increase, pixel-based lossless methods become prohibitively memory expensive. The worst-case jobs will cause the compressed size to be larger than the raw size.

Edge-based lossless algorithms find regions of connected pixels and encode the shape of each region. They can represent single-coloured text or graphic regions very efficiently, since a large area containing many pixels can be described with only a single edge. They are less affected by increases in resolution or bit depth since the number of edges does not increase as the resolution increases. However, natural images do not compress well with edge-based algorithms.

No lossy or lossless method alone produces a satisfactory outcome for the compression of RIP output. A typical RIP output contains a wide variety of different requirements across a single page. Pixel data generated by a RIP can belong to one of a number of different region types, such as text, graphic and natural image regions. Each region type has different characteristics and hence different compression requirements. A combination or hybrid of lossless and lossy methods is one way to achieve high compression ratio while maintaining high quality, with the lossless method preserving the sharp colour transitions while the lossy method providing strong compression of regions with many colours.

The hybrid approach requires some method of identifying which regions should be encoded losslessly and which should be encoded lossily.

Regions of pixels that form characters, symbols and other glyphs are referred to as text regions. Regions of pixels that form large regions of the same colour commonly found in many block diagrams, charts and clip art are referred to as graphic regions. Text regions and graphic regions both contain a single colour per region and require the transitions between regions to be defined accurately in order to maintain sharp edges. Usually, lossless encoding is used for those regions. Text and graphics regions are collectively referred to as "flat regions", also referred to in this description as "first regions".

Image regions, also referred to as "second regions" in this description are regions that contain many colours that vary more smoothly than the transitions between colours in graphic or text regions. These regions, typically associated with photographic images, contain a large quantity of data due to the constantly changing colours within the region. Usually, lossy encoding is used for image regions. The boundary of an image region must still be retained accurately since the human visual system will treat the boundary between an image region and a flat region much the same as the boundary between two flat regions. However, the pixels within an image region do not need to be preserved exactly since the human visual system is less sensitive to small variations in colour or luminance within an image region.

FIG. 1 is a schematic block diagram of a typical printing system 100, which includes a Personal Computer 101 connected to a Printer 105 through a Network 104. As described hereinafter in more detail in regard to FIGS. 21A and 21B, the Personal Computer 101 and the Printer 105 each include at least one processor unit, a memory unit, and a Modulator-Demodulator (Modem) transceiver device for communicating to and from the Network 104. The Printer 105 further includes a Printer Engine 107. The Network 104 may be any connection, including a Universal Serial Port (USB) or parallel port connection.

When a user 2168 (see FIG. 21A) of the Personal Computer 101 chooses to print a document 2171 to a physical medium using the Printer 105, there are a number of stages in the process. Firstly, a Software Application 102 executing on the Personal Computer 101 generates data in the form of a page description language (PDL), such as Adobe™ PostScript™ or Hewlett-Packard's Printer Command Language (PCL), which describes objects to be printed. Secondly, a Host Print Manager 103 also executing on the Personal Computer 103 processes the PDL, before transmitting the resulting data from the Personal Computer 101 via the Network 104 to the Printer 105.

A Client Print Manager 106 in the Printer 105 performs further processing before the resulting data is provided to the Printer Engine 107 of the printer 105 where the resulting data is printed on a physical medium.

The work done by the Host Print Manager 103 and the Client Print Manager 106 usually consists of job generation, raster image processing (RIP), RIP output compression, RIP output decompression and post-RIP processing. These tasks can be split between the Host Print Manager 103 and the Client Print Manager 106 in a number of different ways, depending on the type of architecture chosen.

The RIP is responsible for combining the many levels and objects that can exist in a typical print job into a 2-dimensional rasterized output. The output must be capable of defining the colour value for each pixel of the page area at the chosen resolution. Due to the real-time requirements of a laser printer engine, the entire page in raster form is usually available for printing once Post-RIP Processing starts.

Post-RIP Processing is the process of taking the rendered data, performing any final processing needed and feeding the data in real-time to the Printer Engine 107. If all stages of the print process could guarantee real-time supply of data, then a simple, single pass system could operate, where data is pipelined through the system at constant speed just in time for printing. However, raster image processors do not always operate in real time due to the varying complexity of source data that needs to be rendered.

In a typical laser print engine, post-RIP processing must operate in real time as the page is fed through the Printer 105, otherwise the Printer Engine 107 will stall and the entire page will need to be printed again. In order to guarantee supply of data in real-time, an entire page of RIP output must be buffered. The memory required to buffer an entire page of uncompressed pixel data is cost-prohibitive. Therefore, RIP Output Compression is necessary to achieve adequate performance at a low cost. The decompression of the RIP output must also be performed in real time.

The delegation of tasks to either the Host Print Manager 103 or the Client Print Manager 106 depends on the type of architecture chosen. The two common architectures are client-based and host-based.

Figure 2:
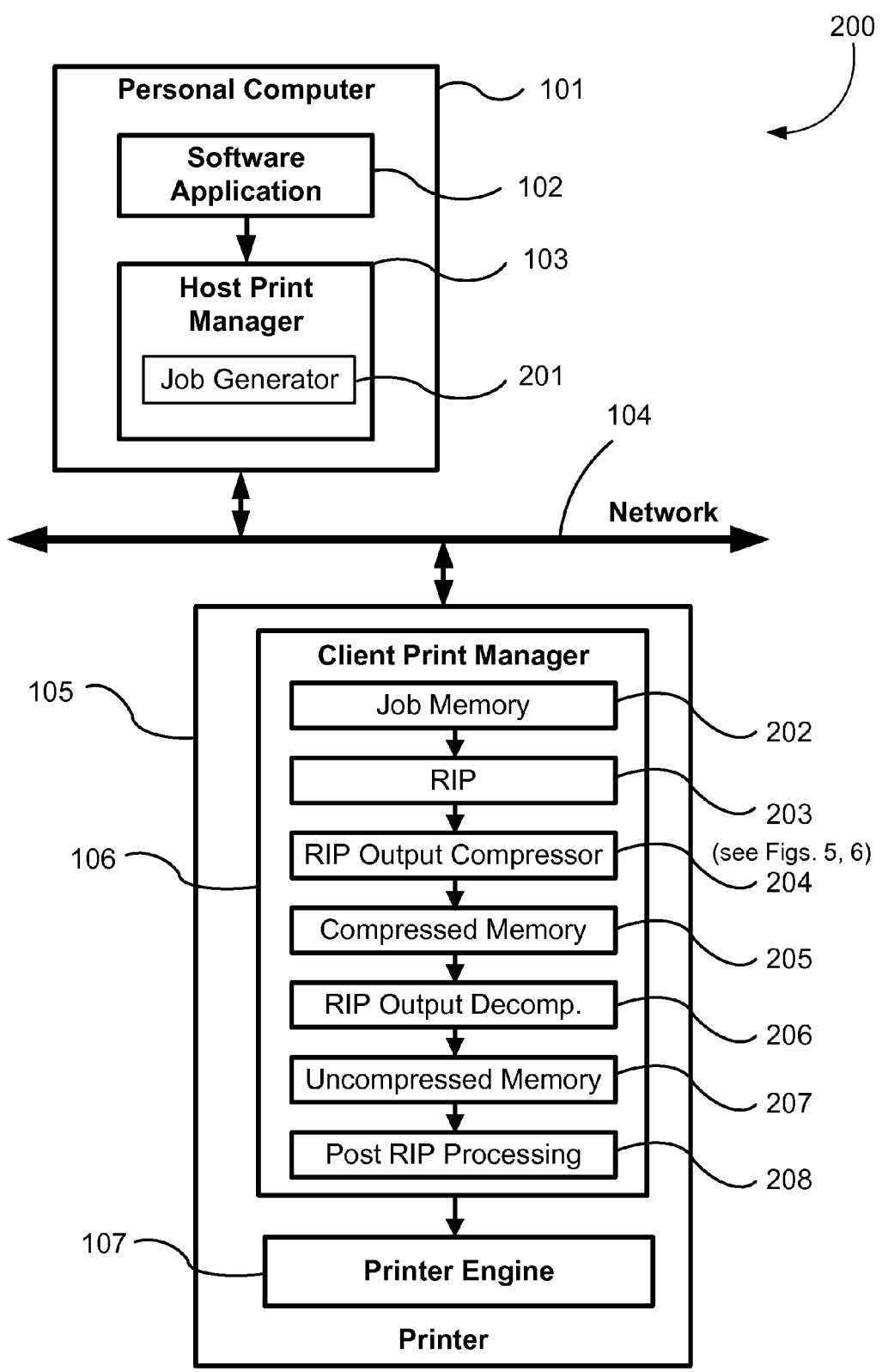
FIG. 2 shows a schematic block diagram of the printing system of FIG. 1 having a client-based architecture.

FIG. 2 shows a schematic block diagram of a client-based architecture for the printing system of FIG. 1 where the majority of the processing is performed by the Client Print Manager 106. The user 2168 of the Personal Computer 101 chooses to print the document 2171, causing the Software Application 102 to create a PDL, which is sent to the Host Print Manager 103. A Job Generator 201 within the Host Print Manager 103 takes the PDL and organizes it into a format that can be supplied to a RIP 203 in the Client Print Manager 106. From the Job Generator 201 the data is sent over the Network 104 to the Printer 105 that stores the data in a Job Memory 202 of the Client Print Manager 106. The data is then rendered by the RIP 203 to create a bitmap of pixels called the RIP Output. The RIP output is then compressed by a RIP Output Compressor 204 and stored in a Compressed Memory 205 (where the term "compressed memory" is used to refer to a section of memory allocated to the storage of compressed data). Before the Printer Engine 107 requires the information, the data is decompressed by a RIP Output Decompressor 206 into Uncompressed Memory 207 (where the term "uncompressed memory is used to refer to a section of memory allocated to the storage of uncompressed data). This data is modified by the Post-Rip Processor 208 in a number of ways to optimize the print quality produced by the Print Engine 107. Finally, the pixel data is supplied to the Print Engine 107.

Figure 3:
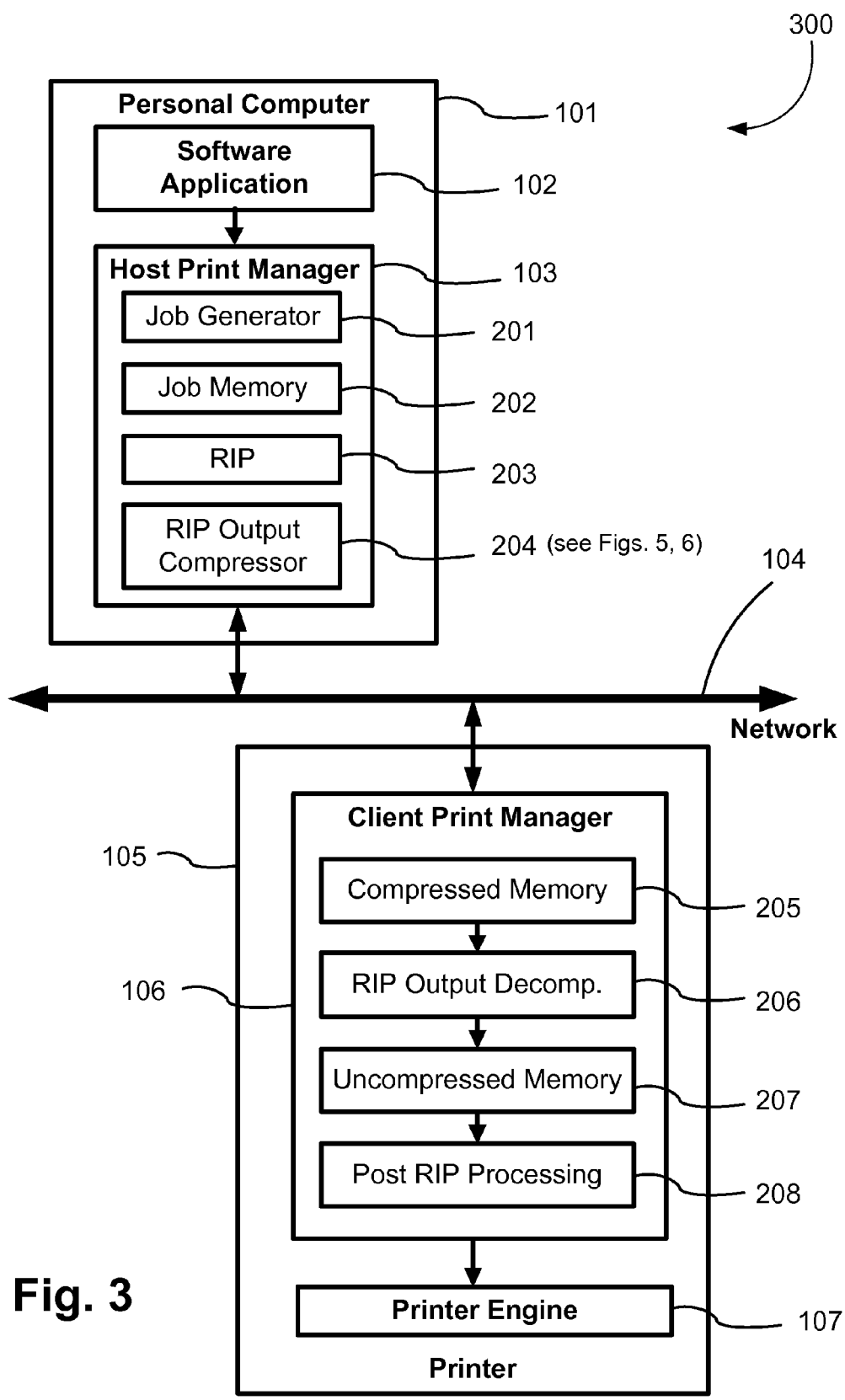
FIG. 3 shows a schematic block diagram of the printing system of FIG. 1 having a host-based architecture.

FIG. 3 shows a schematic block diagram of a host-based architecture of the printing system of FIG. 1 where a large proportion of the processing has been shifted into the Host Print Manager 103. The user 2168 of the Personal Computer 101 chooses to print the document 2171, causing the Software Application 102 to create a PDL that is sent to the Host Print Manager 103. The Job Generator 201 processes the PDL and organizes it into a format that can be supplied to the RIP 203. This data is stored in the Job Memory 202 before being rendered by the RIP 203 to create a bitmap of pixels called the RIP Output. The RIP Output is compressed by the RIP Output Compressor 204 and sent over the Network 104 to the Client Print Manager 106 in the Printer 105 to be stored in the Compressed Memory 205. Before the Printer Engine 107 requires the information, the data is decompressed by the RIP Output Decompressor 206 and stored in the Uncompressed Memory 207. From there, the Post-RIP Processor 208 modifies the data in a number of ways to optimize the print quality produced by the Print Engine 107. Finally, the pixel data is sent to the Print Engine 107.

Figure 21A:
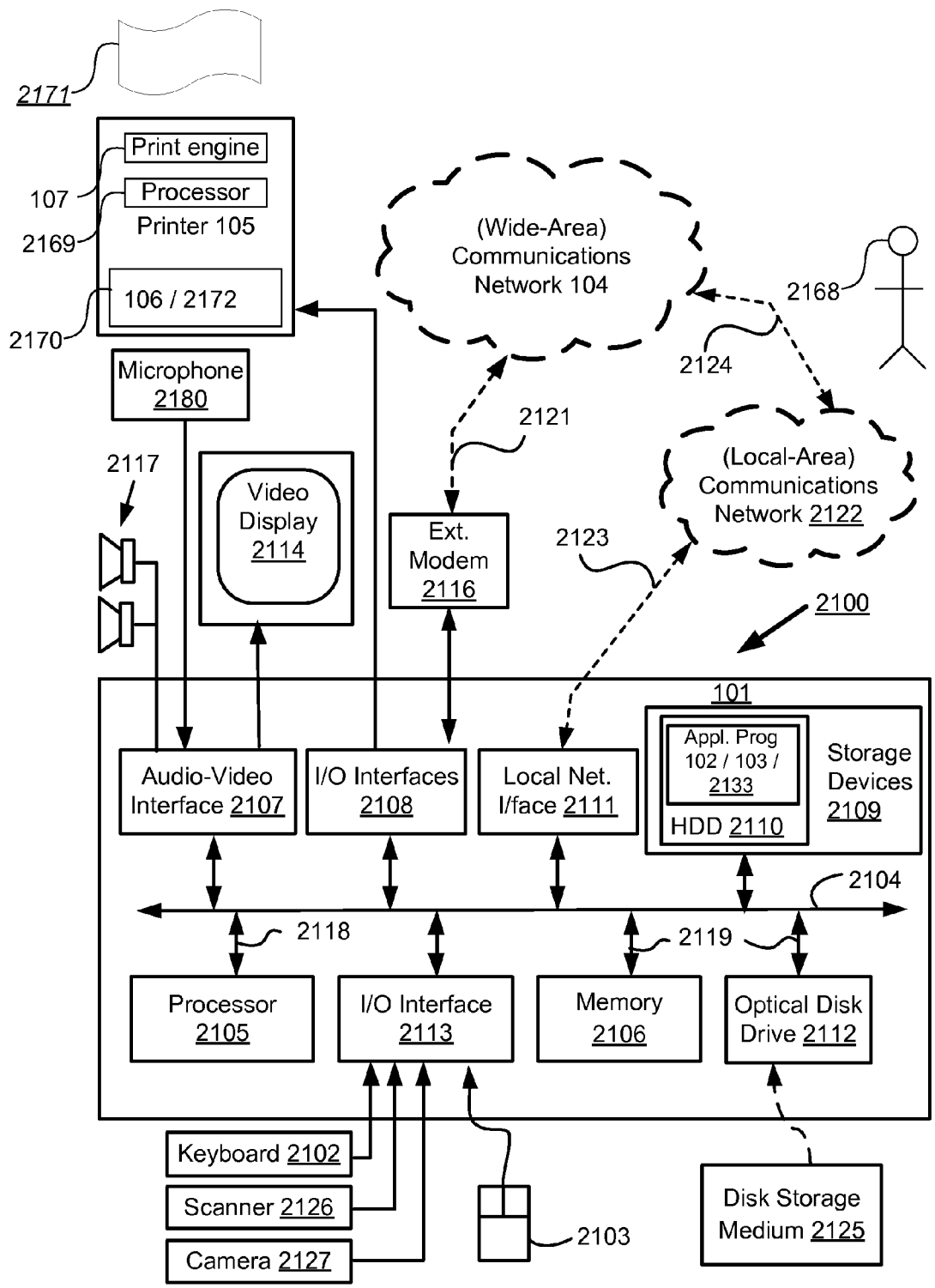
FIGS. 21A and 21B form a schematic block diagram of a general-purpose computer system upon which arrangements described can be practiced.
Figure 21B:
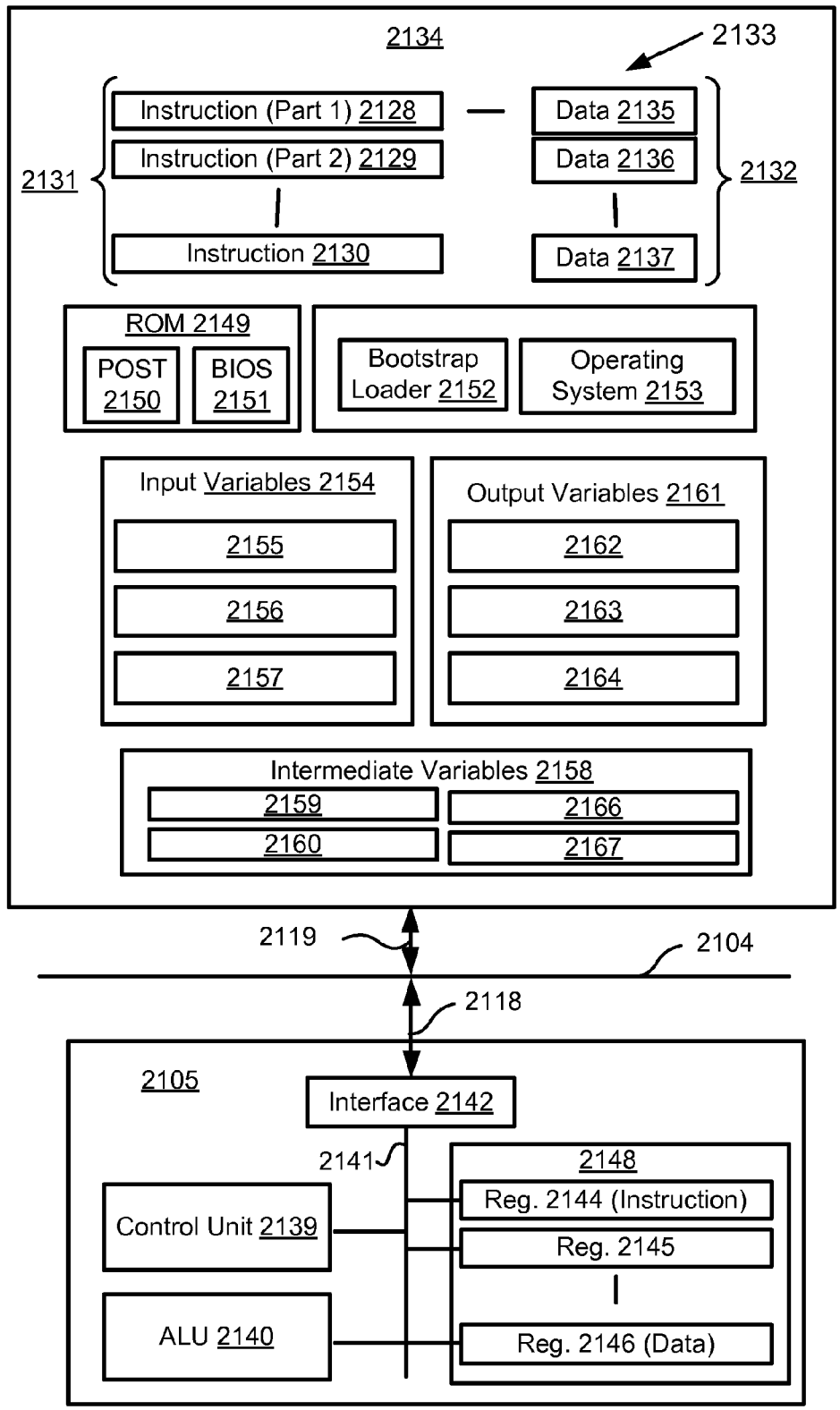

FIGS. 21A and 21B depict a general-purpose computer system 2100, upon which the various SPR arrangements described can be practiced. The description associated with FIGS. 21A and 21B is directed primarily to the structure and function of the personal computer 101, however the structure and function of the printer 105 is quite similar and accordingly descriptions of how the personal computer operates may be applied in large measure to the printer.

As seen in FIG. 21A, the computer system 2100 includes: a computer module 101; input devices such as a keyboard 2102, a mouse pointer device 2103, a scanner 2126, a camera 2127, and a microphone 2180; and output devices including the printer 105, a display device 2114 and loudspeakers 2117. An external Modulator-Demodulator (Modem) transceiver device 2116 may be used by the computer module 101 for communicating to and from a communications network 104 via a connection 2121. The communications network 104 may be a wide-area network (WAN), such as the Internet, a cellular telecommunications network, or a private WAN. Where the connection 2121 is a telephone line, the modem 2116 may be a traditional "dial-up" modem. Alternatively, where the connection 2121 is a high capacity (e.g., cable) connection, the modem 2116 may be a broadband modem. A wireless modem may also be used for wireless connection to the communications network 104.

The computer module 101 typically includes at least one processor unit 2105, and a memory unit 2106. For example, the memory unit 2106 may have semiconductor random access memory (RAM) and semiconductor read only memory (ROM). The computer module 101 also includes an number of input/output (I/O) interfaces including: an audio-video interface 2107 that couples to the video display 2114, loudspeakers 2117 and microphone 2180; an I/O interface 2113 that couples to the keyboard 2102, mouse 2103, scanner 2126, camera 2127 and optionally a joystick or other human interface device (not illustrated); and an interface 2108 for the external modem 2116 and the printer 105. In some implementations, the modem 2116 may be incorporated within the computer module 101, for example within the interface 2108. The computer module 101 also has a local network interface 2111, which permits coupling of the computer system 2100 via a connection 2123 to a local-area communications network 2122, known as a Local Area Network (LAN). As illustrated in FIG. 21A, the local communications network 2122 may also couple to the wide network 104 via a connection 2124, which would typically include a so-called "firewall" device or device of similar functionality. The local network interface 2111 may comprise an Ethernet™ circuit card, a Bluetooth™ wireless arrangement or an IEEE 802.11 wireless arrangement; however, numerous other types of interfaces may be practiced for the interface 2111.

The I/O interfaces 2108 and 2113 may afford either or both of serial and parallel connectivity, the former typically being implemented according to the Universal Serial Bus (USB) standards and having corresponding USB connectors (not illustrated). Storage devices 2109 are provided and typically include a hard disk drive (HDD) 2110. Other storage devices such as a floppy disk drive and a magnetic tape drive (not illustrated) may also be used. An optical disk drive 2112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 2100.

The components 2105 to 2113 of the computer module 101 typically communicate via an interconnected bus 2104 and in a manner that results in a conventional mode of operation of the computer system 2100 known to those in the relevant art. For example, the processor 2105 is coupled to the system bus 2104 using a connection 2118. Likewise, the memory 2106 and optical disk drive 2112 are coupled to the system bus 2104 by connections 2119. Examples of computers on which the described arrangements can be practised include IBM-PC's and compatibles, Sun Sparcstations, Apple Mac™ or a like computer systems.

The SPR method may be implemented using the computer system 2100 wherein the processes of FIGS. 6-8, 11-12 and 18, to be described, may be implemented as one or more software application programs 2133, 2172 executable within the computer system 2100. The SPR methods may be implemented using either the program 2133 executing on the computer 101 and/or the program 2172 executing on the printer 105. In particular, the steps of the SPR method are effected by instructions 2131 (see FIG. 21B) in the software 2133, 2172 that are carried out within the computer system 2100. The software instructions 2131 may be formed as one or more code modules, each for performing one or more particular tasks. The software may also be divided into two separate parts, in which a first part and the corresponding code modules performs the SPR methods and a second part and the corresponding code modules manage a user interface between the first part and the user.

The software may be stored in a computer readable medium, including the storage devices described below, for example. The software is loaded into the computer system 2100 from the computer readable medium, and then executed by the computer system 2100. A computer readable medium having such software or computer program recorded on the computer readable medium is a computer program product. The use of the computer program product in the computer system 2100 preferably effects an advantageous apparatus for performing the SPR method.

The software 2133, 2172 are typically stored in the HDD 2110 and/or the memory 2106 and/or the memory 2170. The software is loaded into the computer system 2100 from a computer readable medium, and executed by the computer system 2100. Thus, for example, the software 2133 may be stored on an optically readable disk storage medium (e.g., CD-ROM) 2125 that is read by the optical disk drive 2112. A computer readable medium having such software or computer program recorded on it is a computer program product. The use of the computer program product in the computer system 2100 preferably effects an apparatus for performing the SPR method.

In some instances, the application programs 2133, 2172 may be supplied to the user encoded on one or more CD-ROMs 2125 and read via the corresponding drive 2112, or alternatively may be read by the user from the networks 104 or 2122. Still further, the software can also be loaded into the computer system 2100 from other computer readable media. Computer readable storage media refers to any non-transitory tangible storage medium that provides recorded instructions and/or data to the computer system 2100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 2133, 2172 and the corresponding code modules mentioned above may be executed to implement one or more graphical user interfaces (GUIs) to be rendered or otherwise represented upon the display 2114. Through manipulation of typically the keyboard 2102 and the mouse 2103, a user of the computer system 2100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2117 and user voice commands input via the microphone 2180.

FIG. 21B is a detailed schematic block diagram of the processor 2105 and a "memory" 2134. The memory 2134 represents a logical aggregation of all the memory modules (including the HDD 2109 and semiconductor memory 2106) that can be accessed by the computer module 101 in FIG. 21A. The structure and function depicted in FIG. 21B also apply, possibly with some alterations, to the operation of the printer 105 and the application program 2172.

When the computer module 101 is initially powered up, a power-on self-test (POST) program 2150 executes. The POST program 2150 is typically stored in a ROM 2149 of the semiconductor memory 2106 of FIG. 21A. A hardware device such as the ROM 2149 storing software is sometimes referred to as firmware. The POST program 2150 examines hardware within the computer module 101 to ensure proper functioning and typically checks the processor 2105, the memory 2134 (2109, 2106), and a basic input-output systems software (BIOS) module 2151, also typically stored in the ROM 2149, for correct operation. Once the POST program 2150 has run successfully, the BIOS 2151 activates the hard disk drive 2110 of FIG. 21A. Activation of the hard disk drive 2110 causes a bootstrap loader program 2152 that is resident on the hard disk drive 2110 to execute via the processor 2105. This loads an operating system 2153 into the RAM memory 2106, upon which the operating system 2153 commences operation. The operating system 2153 is a system level application, executable by the processor 2105, to fulfil various high level functions, including processor management, memory management, device management, storage management, software application interface, and generic user interface.

The operating system 2153 manages the memory 2134 (2109, 2106) to ensure that each process or application running on the computer module 101 has sufficient memory in which to execute without colliding with memory allocated to another process. Furthermore, the different types of memory available in the system 2100 of FIG. 21A must be used properly so that each process can run effectively. Accordingly, the aggregated memory 2134 is not intended to illustrate how particular segments of memory are allocated (unless otherwise stated), but rather to provide a general view of the memory accessible by the computer system 2100 and how such is used.

As shown in FIG. 21B, the processor 2105 includes a number of functional modules including a control unit 2139, an arithmetic logic unit (ALU) 2140, and a local or internal memory 2148, sometimes called a cache memory. The cache memory 2148 typically includes a number of storage registers 2144-2146 in a register section. One or more internal busses 2141 functionally interconnect these functional modules. The processor 2105 typically also has one or more interfaces 2142 for communicating with external devices via the system bus 2104, using a connection 2118. The memory 2134 is coupled to the bus 2104 using a connection 2119.

The application program 2133 includes a sequence of instructions 2131 that may include conditional branch and loop instructions. The program 2133 may also include data 2132 which is used in execution of the program 2133. The instructions 2131 and the data 2132 are stored in memory locations 2128, 2129, 2130 and 2135, 2136, 2137, respectively. Depending upon the relative size of the instructions 2131 and the memory locations 2128-2130, a particular instruction may be stored in a single memory location as depicted by the instruction shown in the memory location 2130. Alternately, an instruction may be segmented into a number of parts each of which is stored in a separate memory location, as depicted by the instruction segments shown in the memory locations 2128 and 2129.

In general, the processor 2105 is given a set of instructions which are executed therein. The processor 1105 waits for a subsequent input, to which the processor 2105 reacts to by executing another set of instructions. Each input may be provided from one or more of a number of sources, including data generated by one or more of the input devices 2102, 2103, data received from an external source across one of the networks 104, 2102, data retrieved from one of the storage devices 2106, 2109 or data retrieved from a storage medium 2125 inserted into the corresponding reader 2112, all depicted in FIG. 21A. The execution of a set of the instructions may in some cases result in output of data. Execution may also involve storing data or variables to the memory 2134.

The disclosed SPR arrangements use input variables 2154, which are stored in the memory 2134 in corresponding memory locations 2155, 2156, 2157. The SPR arrangements produce output variables 2161, which are stored in the memory 2134 in corresponding memory locations 2162, 2163, 2164. Intermediate variables 2158 may be stored in memory locations 2159, 2160, 2166 and 2167.

Referring to the processor 2105 of FIG. 21B, the registers 2144, 2145, 2146, the arithmetic logic unit (ALU) 2140, and the control unit 2139 work together to perform sequences of micro-operations needed to perform "fetch, decode, and execute" cycles for every instruction in the instruction set making up the program 2133. Each fetch, decode, and execute cycle comprises:

(a) a fetch operation, which fetches or reads an instruction 2131 from a memory location 2128, 2129, 2130;

(b) a decode operation in which the control unit 2139 determines which instruction has been fetched; and (c) an execute operation in which the control unit 2139 and/or the ALU 2140 execute the instruction.

Thereafter, a further fetch, decode, and execute cycle for the next instruction may be executed. Similarly, a store cycle may be performed by which the control unit 2139 stores or writes a value to a memory location 2132.

Each step or sub-process in the processes of FIGS. 6-8, 11-12 and 18 is associated with one or more segments of the program 2133 and/or the program 2172 and is performed, if relating to the program 2133, by the register section 2144, 2145, 2147, the ALU 2140, and the control unit 2139 in the processor 2105 working together to perform the fetch, decode, and execute cycles for every instruction in the instruction set for the noted segments of the program 2133, and if relating to the program 2172, by corresponding register sections, ALUs, control units and processors in the printer 105.

The SPR method may alternatively be implemented in dedicated hardware such as one or more gate arrays and/or integrated circuits performing the SPR functions or sub functions. Such dedicated hardware may also include graphic processors, digital signal processors, or one or more microprocessors and associated memories. If gate arrays are used, the process flow charts in FIGS. 6-8, 11-12 and 18 are converted to Hardware Description Language (HDL) form. This HDL description is converted to a device level netlist which is used by a Place and Route (P&R) tool to produce a file which is downloaded to the gate array to program it with the design specified in the HDL description.

The SPR arrangements include a number of compression algorithms for compressing rasterised data using a combination of lossless compression and lossy compression, and post-compression memory recovery strategies. In the disclosed examples, the rasterised data is supplied to the compression algorithm in a tile-by-tile order. The rasterised data can however be provided in other forms such as strip by strip.

The disclosed examples of the SPR arrangement compress images as tiles. For the purposes of this arrangement a tile shall refer a block of N by M pixels wherein there are multiple blocks across the width of the page and multiple blocks down the length of the page. Tiles are disjoint and cover the page. A tile preferably consists of an integral number of 8×8 blocks of pixels like a block 402. For example for an A4 page at a printer resolution of 600 dpi, a suitable choice for tile dimensions is M=N=64. The position of a pixel (X, Y), where X and Y are integers, within a tile is relative to the upper left hand corner of the tile. Y indexes the tile rows whereas X indexes the offset of a pixel along a tile row. A tile row consists of the set of pixels that span the width of the tile.

Figure 4:
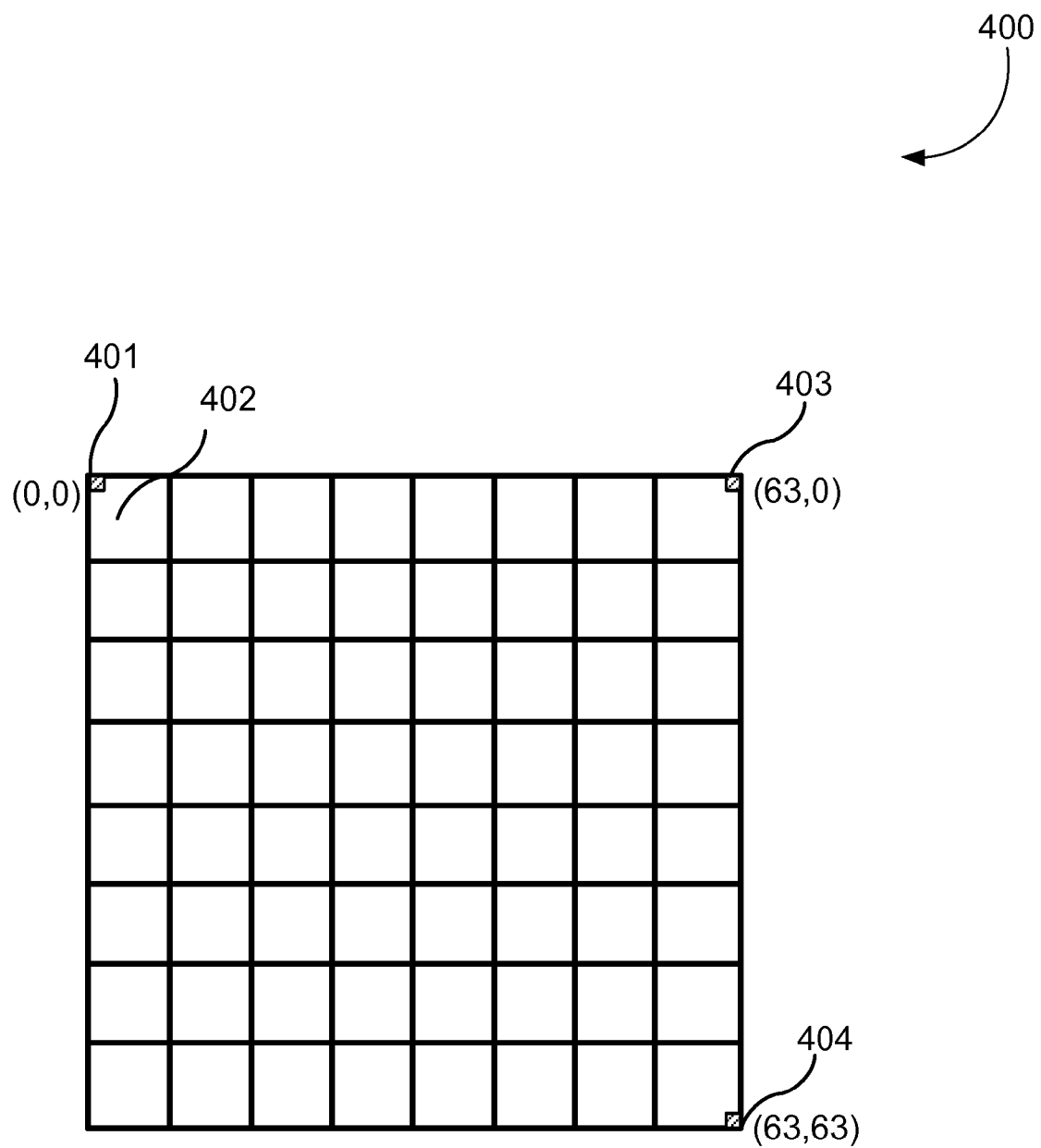
FIG. 4 depicts a tile.

FIG. 4, for example, shows a tile 400 containing 64×64 pixels where the first pixel 401 in the first tile row occupies a pixel position (0, 0), whereas the last pixel 403 in first tile row occupies a pixel position (63, 0). Accordingly, the last pixel 404 in the last tile row occupies a position (63, 63). Raster tile order refers to processing a tile pixel-by-pixel tile-row by tile-row, in sequential order, starting with the first tile row and ending with the last row. Pixel values, PX,Y, within a tile refer to the color value of pixel P, located at a position (X, Y). Where the dimensions of a page do not contain an integer number of tiles the page is preferably padded to the requisite size. Typically tiles are processed one by one though they may also be processed in parallel.

Figure 5:
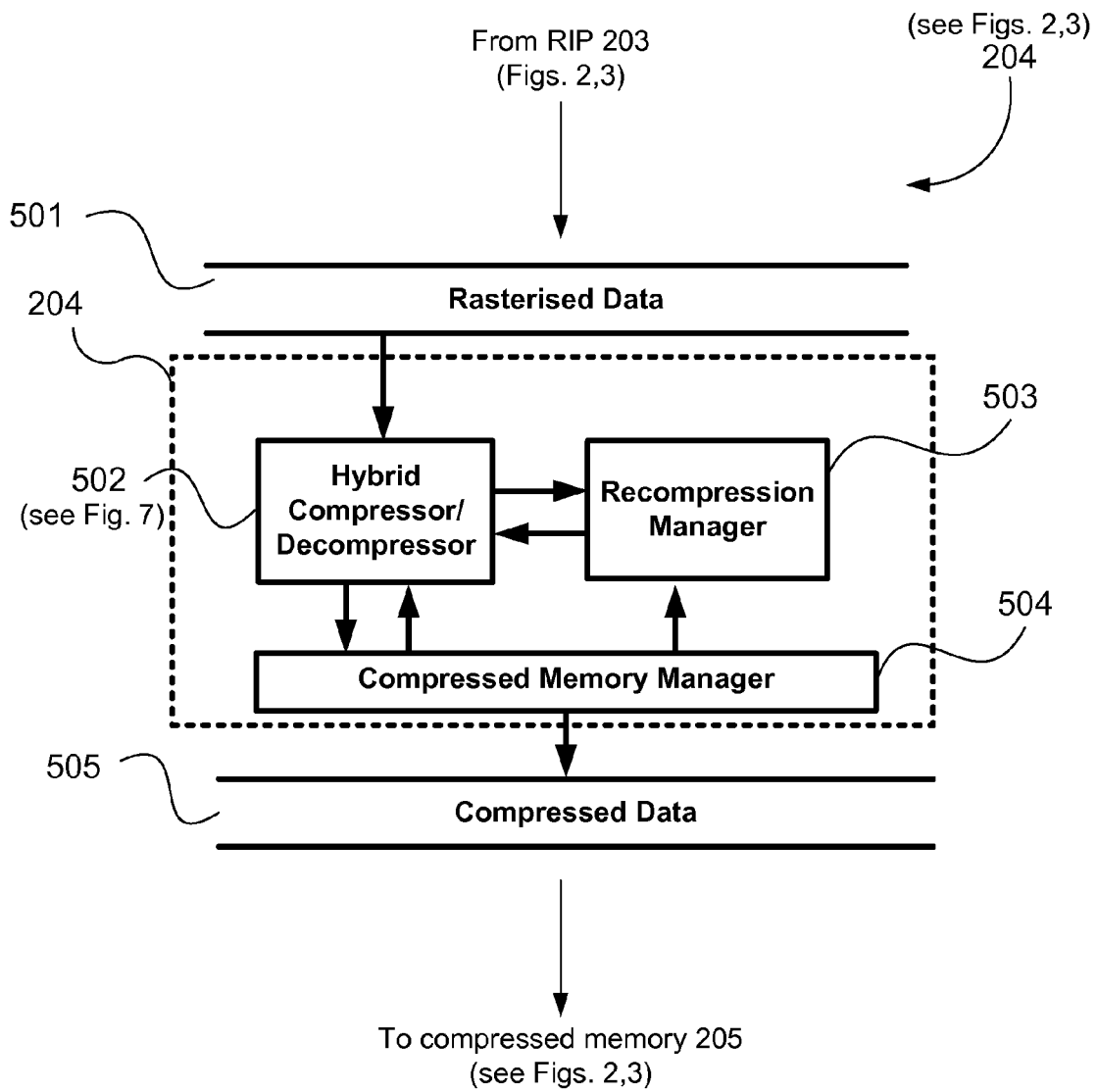
FIG. 5 shows a schematic block diagram for a RIP output compression apparatus as used in the systems of FIGS. 2 and 3 according to an SPR arrangement.

FIG. 5 depicts one example of a functional block diagram of the RIP Output Compressor 204, where the compressor 204 comprises a Hybrid Compressor and Decompressor 502, a Recompression Manager 503 and a Compressed Memory Manager 504.

The RIP Output Compressor 204 receives, from the RIP 203, Rasterised Data 501 as input. The data is passed into the Hybrid Compressor/Decompressor 502 for compression. The Hybrid Compressor/Decompressor 502 compresses data by first segmenting data into regions, then classifying each region either as a lossless region or a lossy region so that the appropriate compression algorithm can be applied to each type of region. Lossy compression algorithm, operating according to specified compression parameters, produces an encoded bitstream, which is passed to the Compressed Memory Manager 504 to be organised into data blocks that are grouped so that progressive image quality is maintained. Each group of data blocks forms a spectral partition.

All partitions are ranked according to a visual significance of the information they represent. The Compressed Memory Manager 504 also determines if partitions need be deleted in order to meet a memory target. It maintains a minimum level of image quality by limiting the number of partitions that can be deleted. During the hybrid compression process, the Hybrid Compressor/Decompressor 502 also sends metadata, relating to the compression data size and the compression parameters, to be collected and stored by the Recompression Manager 503.

After the initial pass of compression has been finished, the Compressed Memory Manager 504 then decides if further action needs to be taken to reduce the amount of the compressed data given the memory requirement (or memory capacity) and the limitation of the partition deletion strategy.

If the Compressed Memory Manager 504 decides that recompression is needed in order to reduce the encoded data size, it initiates the recompression process by first informing the Recompression Manager 503 about the amount of memory by which memory usage is required to be reduced in order to meet the memory requirement. The Recompression Manager 503 then uses the metadata it collected from the initial pass of compression to determine how to best adjust the compression parameters so that the target memory usage can be achieved. The Recompression Manager 503 then instructs the Hybrid Compressor/Decompressor 502 to perform decompression, which reads the encoded data from the Compressed Memory Manager 504 and recompresses the encoded data using the adjusted compression parameters. The output of the RIP Output Compressor 204 is the compressed image data 505 that satisfies the memory requirement.

Compression Flow

Figure 6:
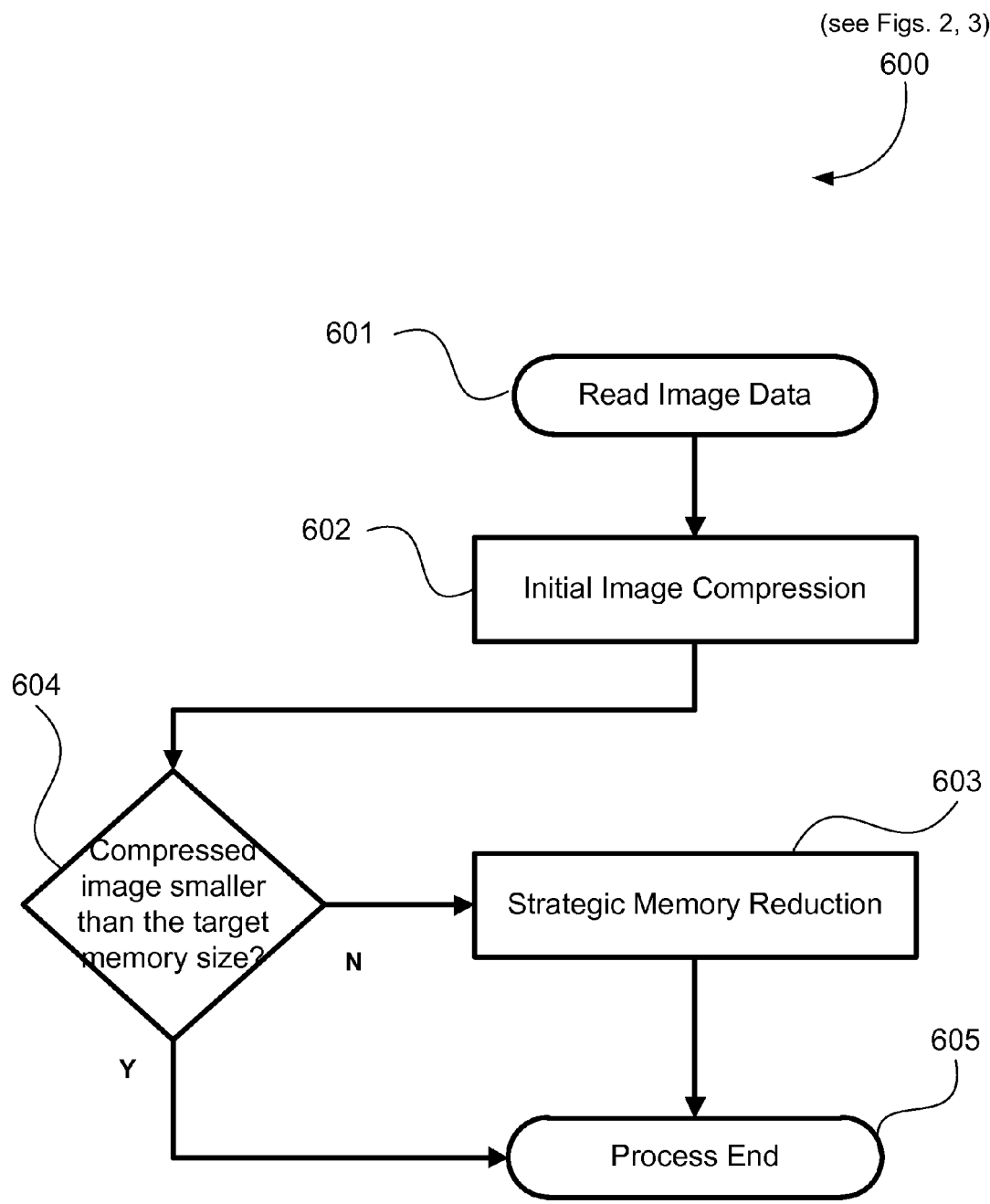
FIG. 6 is a schematic flow diagram of a compression process executed by the RIP output compression apparatus depicted in FIG. 5.

FIG. 6 shows a schematic flow diagram of an example of a compression process 600 for implementing the RIP Output Compressor 204. The disclosed example of the RIP Output Compressor 204 guarantees that the amount of the compressed image data 505 satisfies the memory requirement by applying a two-stage process, as illustrated in 600. The first stage of the process reads the image data in a step 601 and performs an initial compression in a following step 602. The second stage of the process reduces the encoded data size if needed as determined by a decision step 604 by employing a strategic memory reduction in a step 603, before the whole compression process comes to an end at a step 605. If reduction of encoded data size is not needed as determined by the step 604, then the process 204 follows a "Y" arrow to the step 605.

Each stage of the compression process 204 will is described hereinafter in more detail.

The Hybrid Compressor/Decompressor

Figure 7:
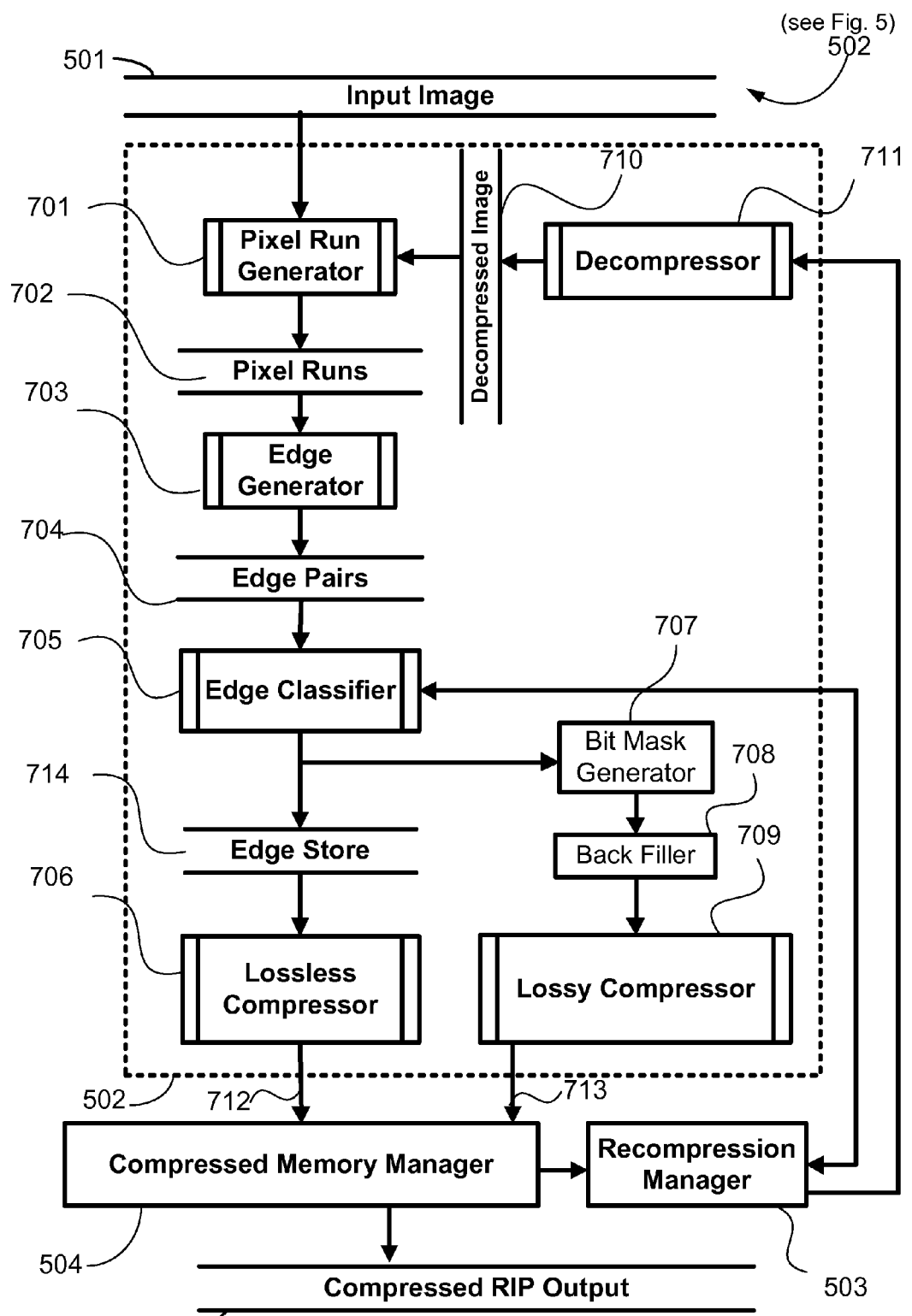
FIG. 7 shows an expanded view of the schematic block diagram for a RIP output compression apparatus as depicted in FIG. 5 according to an SPR arrangement.

FIG. 7 depicts an example of the Hybrid Compressor/Decompressor 502, which is used for the initial image compression in the step 602, as well as image recompression if needed as part of the strategic memory reduction in the step 603.

The input image data 501 or the decompressed image data 710 is first processed by a Pixel Run Generator 701, in which consecutive pixels on the same scanline with the same colour are joined to form a pixel run 702. The pixel runs 702 are then processed by an Edge Generator 703, in which pixel runs with the same colour that neighbour (by 8-way connectedness as described in more detail hereinafter in regard to FIG. 11) on successive scan lines are stitched together to form edges pairs 704. Each edge pair 704 is then assessed by an Edge Classifier 705 using an edge assessment process, described hereinafter in more detail below with respect to FIG. 12. Qualified or valid edge pairs, ie edge pairs meeting the edge assessment criteria, are retained in an Edge Store 714. The other (invalid) edge pairs are discarded. The Edge Classifier 705 also sends edge metadata, which includes information describing the valid edge pairs and the edge assessment criteria used in the edge assessment process, to be collected by the Recompression Manager 503 for the purpose of recompression. The valid edge pairs 704 retained in the Edge Store 714 are compressed by the Lossless Compressor 706. Before being discarded by the edge classifier 705, the invalid edges are sent to Bit Mask Generator 707, where a bit mask is built, on the invalid edges, to indicate the regions selected for lossy compression. Therefore, lossy regions are the regions defined by discarded edge pairs. Before the lossy regions are sent to the lossy compression algorithm, the gaps between the lossy regions indicated by the bit mask are filled with similar colours in a process called backfilling, performed by a Back Filler 708, in order to minimise visual artefacts produced by the Lossy Compressor 709.

Resulting compressed data bitstreams 712, 713 from the Lossless Compressor 706 and the Lossy Compressor 709 respectively are passed to the Compressed Memory Manager 504 to be organised into quality partitions according to their visual significance. The partitions are ranked so that progressive image quality is maintained.

The Compressed Memory Manager 504 together with the Recompression Manager 503 executes strategic memory reduction in the step 603, whereby one of the following three actions needs to be taken to reduce the compressed data size if the memory requirement is not met:
  a) Delete quality partitions, starting from the least visually significant partition; OR
  b) Adjust the Edge Classifier 705 parameters before recompressing the data using the Hybrid Compressor/Decompressor 502, and then if needed delete quality partitions; OR
  c) Change compression mode to by-pass the Lossless Compressor 706 and recompress the data with the Lossy Compressor 709 only, then if needed delete quality partitions.

The strategic memory reduction process 603 and the edge assessment criteria will be described hereinafter in more detail with reference to in FIG. 18 and FIG. 12 respectively.

Pixel Run Generation

Raw pixel data 501 is supplied to the Pixel Run Generator 701 by the RIP 203. For the purposes of this description pixel data is supplied by the RIP 203 on a tile-by-tile basis, where pixels within a tile are supplied in tile raster order. In the disclosed arrangement pixel values are represented by three channels representing a red component (R), a green component (G), and a blue component (B) (collectively referred to as RGB) with 8 bits of precision per channel (also known as bit depth). Other colour representations such as one cyan, one magenta, one yellow and one black channel may also be utilised, along with other bit depths.

Each pixel value within a tile is examined by the Pixel Run Generator 701 in pixel raster order. The output of the Pixel Run Generator 701 is the pixel runs 702. For the purposes of this description a pixel run consists of a sequence of consecutive pixels, wholly contained in one tile row, that have substantially identical colour values. Preferably, the colour values in a run are identical, i.e., the tolerance between colours is zero. An example of pixel run generation is described hereinafter in more detail with reference to FIG. 8.

Figure 8:
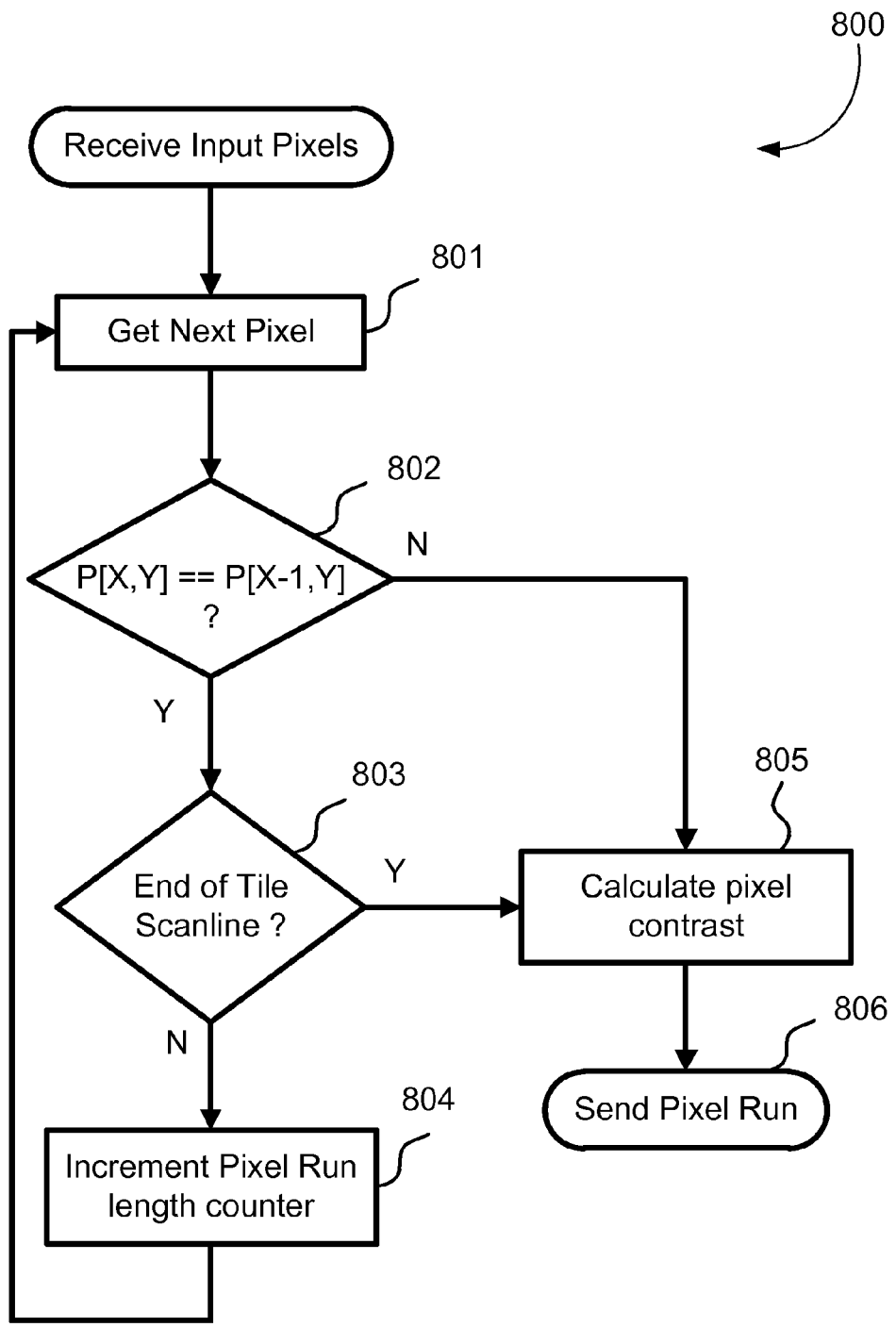
FIG. 8 shows a flow diagram of a pixel run generation process for a single pixel run on a scanline (or row) of a tile.

FIG. 8 shows a schematic flow diagram of an example of a process 800 executed by the Pixel Run Generator 701. On a tile-by-tile basis the Pixel Run Generator 701 generates pixel runs. Pixel run information is stored in a suitable data structure that contains at least a colour value for the pixel run and a pixel run length counter for storing the length of the pixel run.

Referring to FIG. 8, received input pixels are read in a get-next-pixel step 801 one by one. A following pixel-similarity decision step 802 then determines whether the current pixel colour value P[X, Y] is identical or substantially identical (as depicted by a symbol "=" in FIG. 8) to a previous pixel colour value P[X−1, Y]. If the current pixel colour value P[X, Y] is identical or substantially identical to the previous pixel colour value P[X−1, Y] then the process 800 follows a "Y" arrow from the step 802 to a step 803 in which it is determined, in the "check-end-of-line" step 803, whether the tile scanline (tile row) has ended. If the tile scanline has not yet ended, then the process 800 follows a "N" arrow to a step 804 in which the pixel run length counter is incremented in the "increment-length" step 804, and the process 800 then returns to the get-pixel step 801 from where the next pixel in the tile scanline is processed.

If it is determined in the pixel-similarity step 802 that the current pixel colour value P[X, Y] is not identical to the previous pixel colour value P[X−1, Y], or if it is determined in the step 803 that the tile scanline has ended, then the process 800 is directed to a step 805 in which the pixel run is ended and its contrast with neighbouring pixels is calculated in the "calculate-contrast" step 805.

After the contrast has been calculated, the process 800 is directed to a step 806 which sends the pixel run to the Edge-Generator 703 in the "send-pixel-run step" 806. This means that the Pixel Run Generator 701 need only store one pixel run at any given time during processing of the tile.

The calculate-contrast step 805 determines the contrast of a pixel run using the magnitude of the colour differences between the pixel run and its surrounding pixels.

Figure 9:
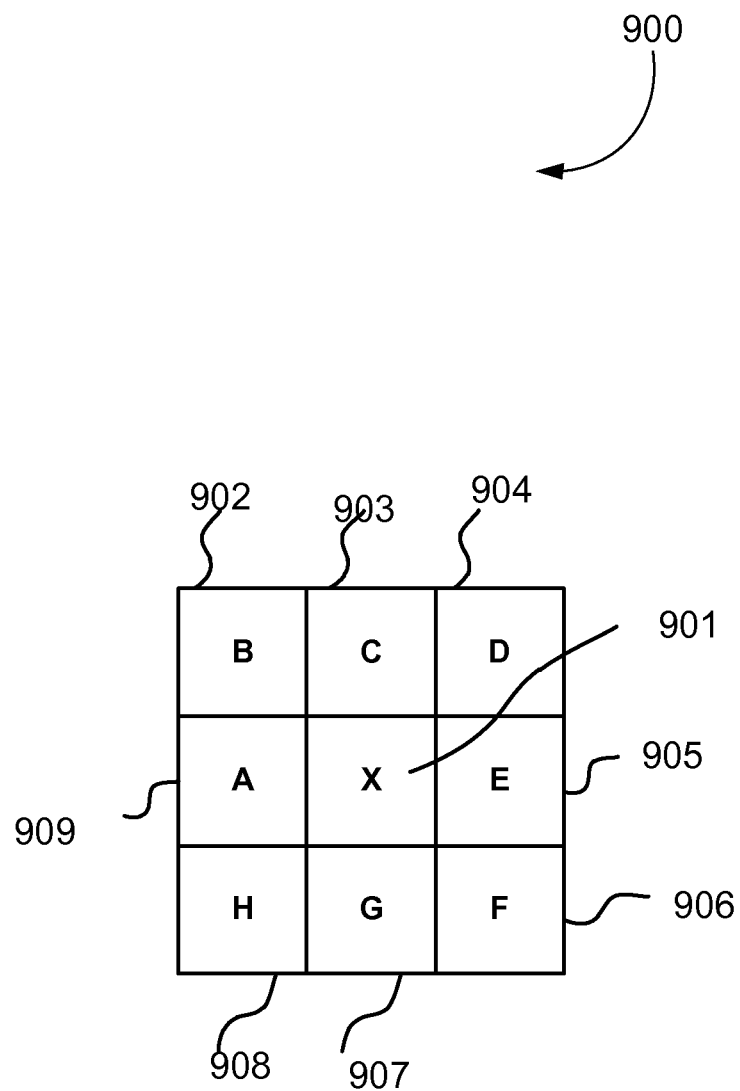
FIG. 9 shows the neighbourhood of pixels used to calculate contrast for a pixel run.

FIG. 9 shows an example pixel run consisting of a single pixel X (designated by a reference numeral 901). Contrast can be determined as the sum of the magnitude of differences between the pixel run 901 and all its neighbouring pixels 902 to 909 for each colour channel. Alternatively, contrast can be calculated using a subset of its neighbouring pixels. In the disclosed arrangement, the calculate-contrast step 805 calculates two contrast values, referred to as Contrast_L and Contrast_R. Contrast_L is determined as the sum of the magnitude of the color difference for each color channel between the pixel run 901 and the pixel 909, ie the pixel immediately to its left. Contrast_R is determined as the sum of the magnitude of the colour difference for each colour channel between the pixel run 901 and the pixel 905, the pixel immediately to its right.

Edge Joining Criteria

Referring to FIG. 7, the Edge Generator 703 receives the pixel runs 702 in order to generate regions of connected pixel runs that have substantially identical colour values within a tile. Edges mark out the boundaries between neighbouring regions of such connected pixel runs. Each region requires a pair of edges to fully describe its boundary. An "enabling" edge outlines the left hand side of a region, and a "disabling" edge outlines the right hand side of a region. For the purpose of this description the enabling and disabling edges will be known as an "edge pair".

An edge generation process 1100, described hereinafter in more detail with reference to FIG. 11, that is executed by the Edge Generator 703, creates the edge pairs 704 that link pixel runs of identical colour value to one another on successive scan lines forming regions of identical (or substantially identical) colour as described above. New edge pairs, as they are created, are considered active until they are precluded from continuing. The edge pairs 704 are extended when a pixel run on a current scanline overlaps an active edge pair and meets the criteria for joining. For a pixel run to join an active edge pair the pixel run (a) must overlap (using 8-way connectedness) an area that is currently spanned by an active edge pair and (b) have an identical colour value to that associated with the edge pair. As described hereinafter in more detail with reference to FIG. 10, it is convenient to consider active edge pairs on a previous scanline when attempting to determine whether or not a pixel run on a current scan line joins any existing active edge pairs. Edge pairs 704 are not permitted to cross other edge pairs, and the flat regions that are described by edge pairs 704 within a tile are disjoint. Edge pairs 704 can be precluded from continuing in one of two ways, namely (i) a pixel run on the next tile scanline spans across an active edge pair in such a way that the active edge is precluded from continuing, or (ii) the last scanline in the tile is processed and the tile ends. In the event that the edge is prevented from continuing, it is considered "resolved" and flagged as inactive.

Figure 10:
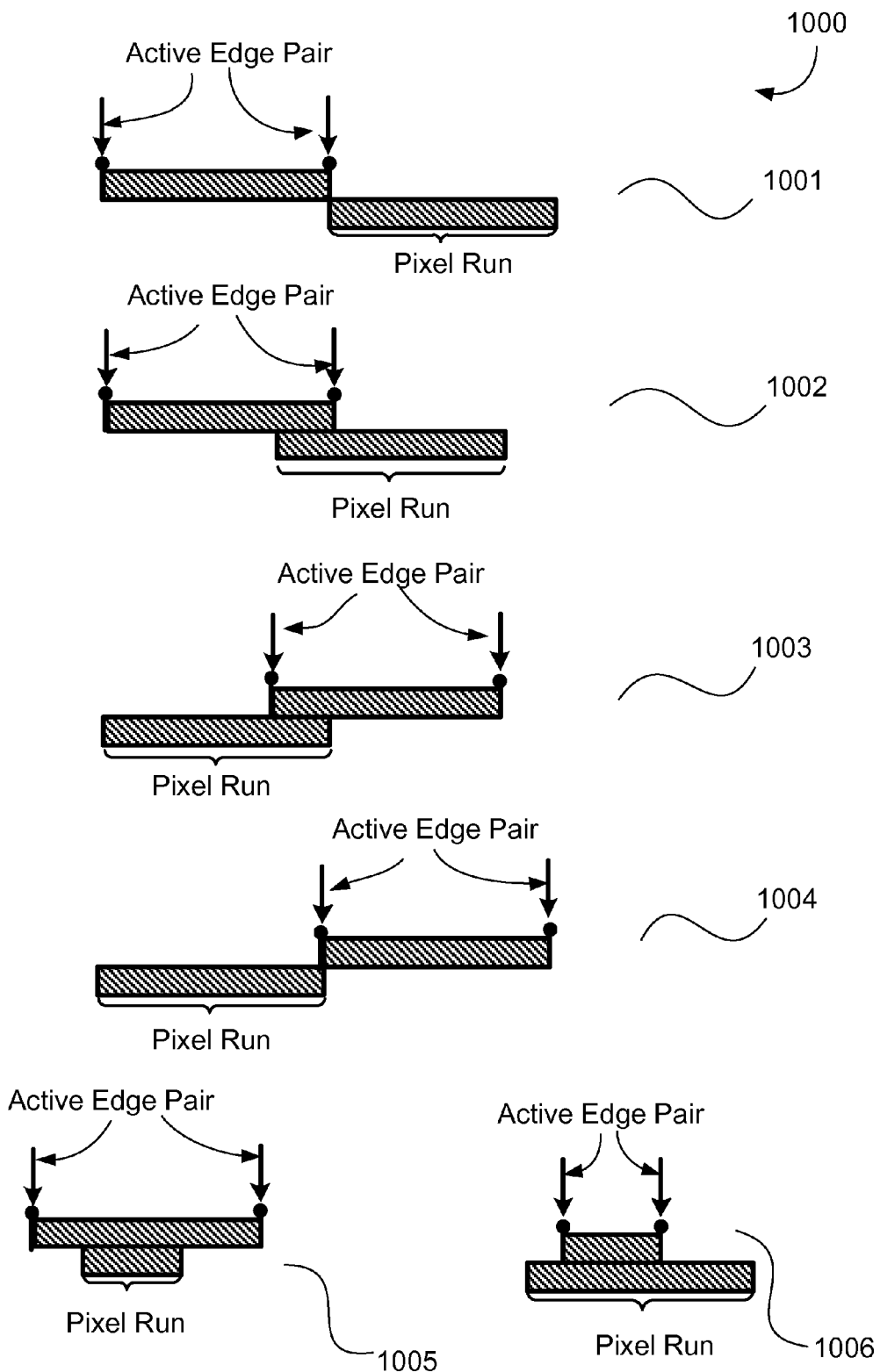
FIG. 10 shows examples of edge forming instances in which joining criteria are met by the candidate pixel runs.

FIG. 10 shows examples 1001, 1002, 1003, 1004, 1005 and 1006 of edge pairs 704 in which the joining criteria are met. In each example, a pixel run on a current scan line joins an active edge pair on a previous scanline if the colour value of the pixel run on the current scanline is substantially identical to the colour value of the active edge pair on the previous scanline. Examples 1001 to 1006, illustrate scenarios where an active edge pair is connected to a pixel run using the 8-way connectedness rule.

Edge Generation

Figure 11:
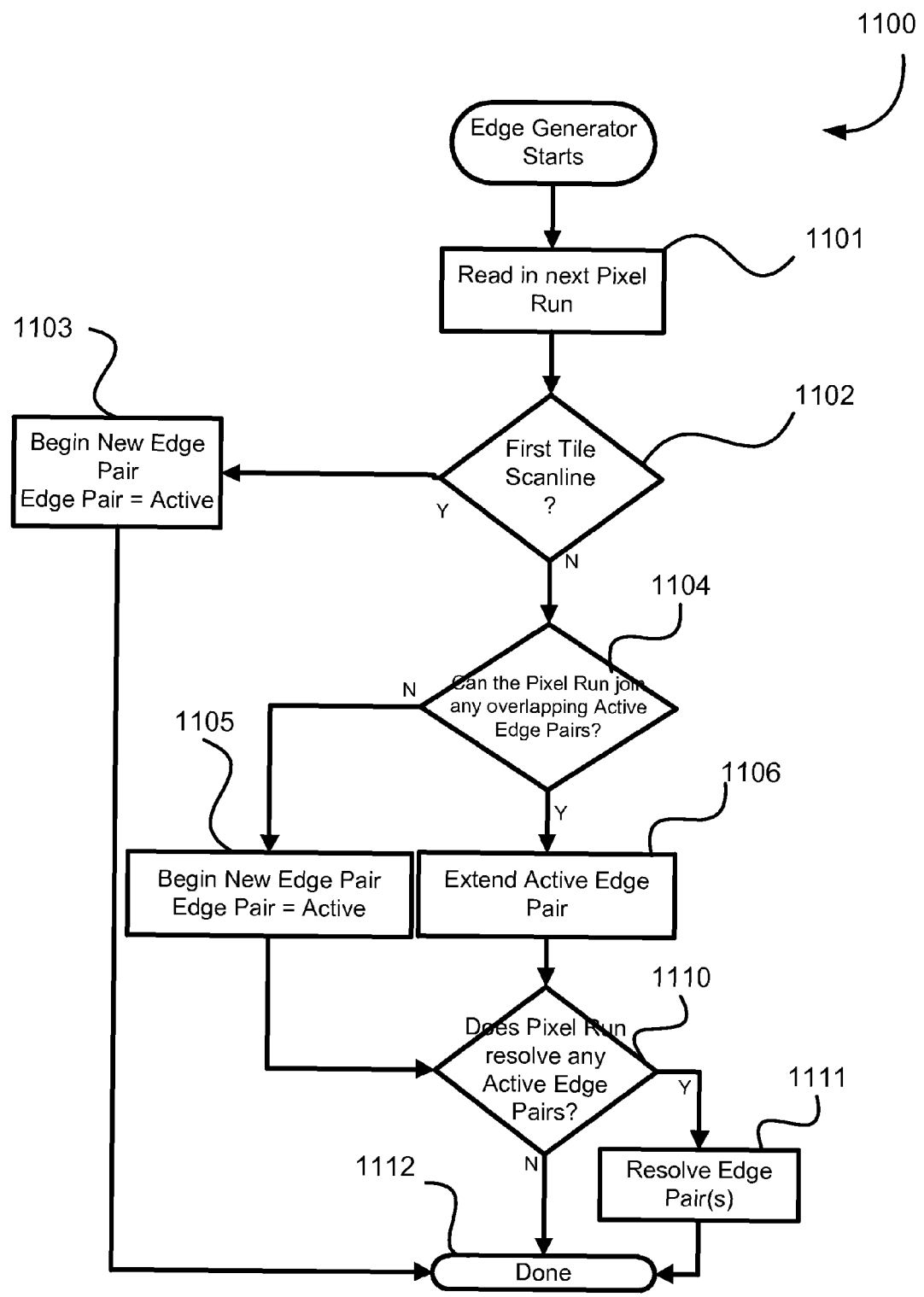
FIG. 11 shows a flow diagram of an edge generation process performed by the Edge Generator.

FIG. 11 shows a flow diagram of an example of a process 1100 performed by the Edge Generator 703. The Edge Generator 703 executes the process 1100 until the entire tile has been processed.

The process 1100 starts in a read-pixel-run step 1101 where the next pixel run from the Pixel Run Generator 701 is read. If a following "check-first-line" step 1102 determines that the pixel run occurs on the first scanline of a tile then the process 1100 proceeds according to a "Y" arrow to a "begin-edge" step 1103 where a new edge pair is created. This edge pair is marked as active. Following the begin-edge step 1103, the process 1100 is directed to a step 1112 and the process ends.

Alternatively, if it is determined in the check-first-line step 1102 that the pixel run occurs on a subsequent row of pixels in a tile, then the process 1100 follows a "N" arrow and the pixel run is examined in a following "check-connectedness" step 1104 to determine whether or not the pixel run can join any existing active edge pairs. If it is determined by the step 1104 that the pixel run cannot join any of the existing active edge pairs, the Edge Generator 703 proceeds according to a "N" arrow to a "start-edge" step 1105 where a new edge pair is created and set to active, after which the process 1100 proceeds to a "check-resolve" step 1110. Alternatively, if it is determined in the check-connectedness step 1104 that the pixel run can join an overlapping active edge pair, then the Edge Generator 703 proceeds according to a "Y" arrow to an "extend-edge" step 1106 where the active edge pair is extended by that pixel run. Following the extend-edge step 1106 the Edge Generator 703 proceeds to the check-resolve step 1110.

In the check-resolve step 1110 it is then determined whether the pixel run extends past other active edge pairs within the tile, thereby precluding them from continuing. If this is the case the process 1100 follows a "Y" arrow and the edge pairs so affected are marked as "resolved" i.e., set as inactive in a following "resolve-edge" step 1111 before the process 1100 is directed to the step 1112 and ends. Alternatively, if in the step 1100 the pixel run does not resolve any active edge pairs, then the process 1100 is directed to the step 1112 and ends.

For the purposes of this description, edge pairs 704 generated by the Edge Generator 703 are ordered in increasing y direction then increasing x direction by the starting position of the enabling edge. The region bounded by the edge pair 704 has a uniform colour.

Edge Assessment

The Edge Classifier 705 assesses resolved edges pairs 704 generated by the Edge Generator 703 for visual significance and determines whether an edge pair is valid or not. An edge pair that is deemed to be visually significant is considered to be valid, and a region that is bounded by a valid edge pair is considered to be a "flat" region. The flat region means that the region has a uniform colour. Only edge pairs describing a flat region are retained and losslessly compressed by the Lossless Compressor 706. The regions defined by non-valid edge pairs are marked as the lossy regions by the bit-mask generated by the Bit Mask Generator 707. The non-valid edge pairs are discarded, and the masked lossy regions are backfilled by the Back Filler 708, and then passed to the Lossy Compressor 709 for lossy compression.

In the described SPR arrangements, the Edge Classifier 705 uses a combination of two criteria to determine whether an edge pair is valid or not. These criteria being as follows:
   (i) the maximum width of the region defined by the edge pair and the edge pair length (the length of the region defined by the edge pair); and
   (ii) the contrast significance of the region defined by the edge pair, to assess the visual significance of an edge pair.
   The above-noted criteria are collectively referred to as the edge assessment criteria. Other edge assessment criteria may also be used, such as the area of the region defined by the edge pair.

Figure 12:
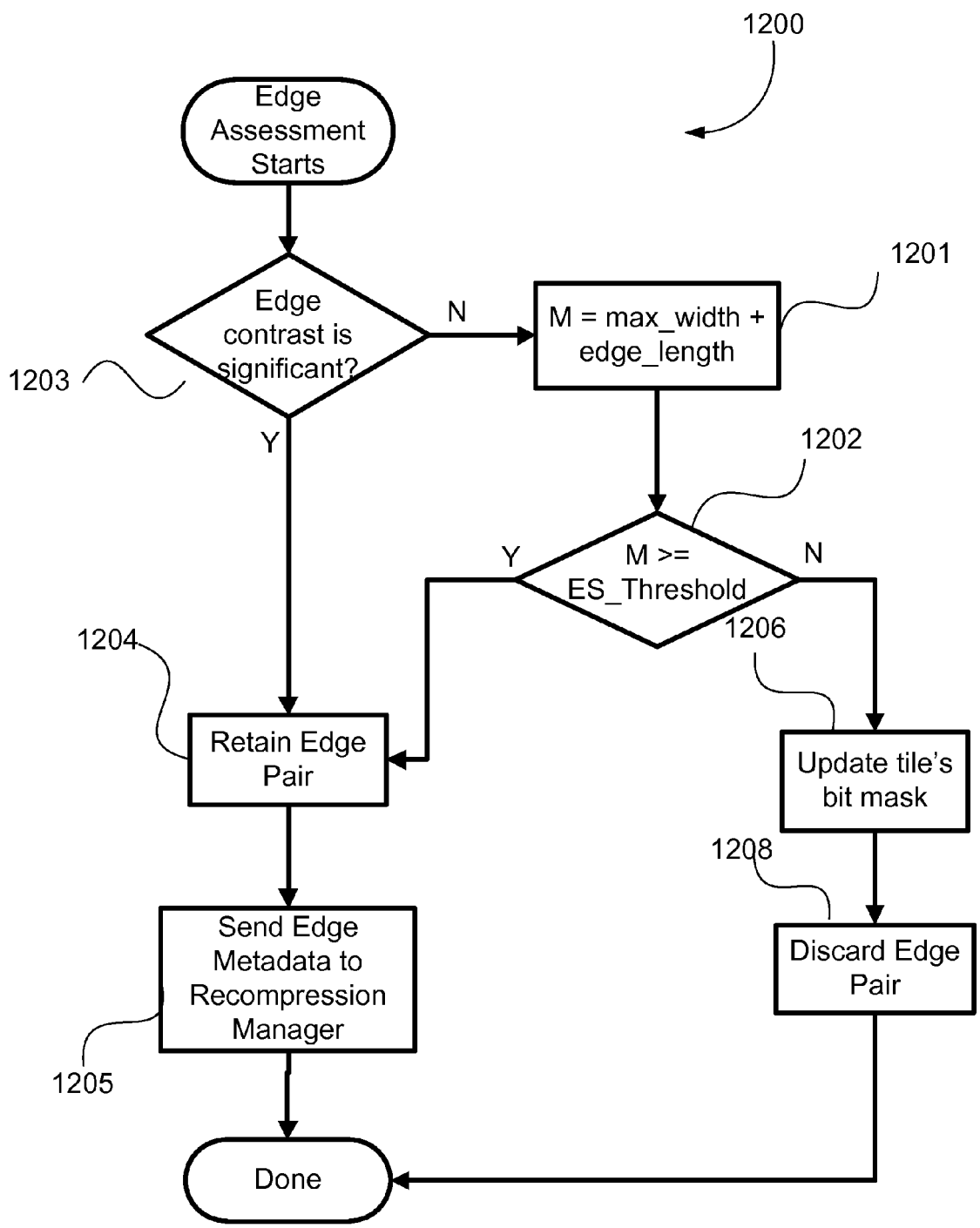
FIG. 12 shows a schematic flow diagram of a method for assessing the visual significance of edges generated by the Edge Generator.

FIG. 12 shows a schematic flow diagram of an example 1200 of an edge assessment process and a subsequent bit-masking process performed by the Edge Classifier 705 and the Bit Mask Generator 707. The process 1200 starts with a "check-edge-contrast" step 1203 upon receiving an edge pair generated by the Edge Generator 703, where it is determined whether the edge pair is significant by contrast. In the disclosed arrangement, an edge pair is considered significant by contrast if more than half of the pixel runs making up the region bounded by the edge pair are judged to be high contrast, according to a specified contrast threshold CT_Threshold, using the result calculated in the step 805 executed by the Pixel Run Generator 701.

Edge pairs judged to be significant by contrast by the step 1203 cause the process 1200 to follow a "Y" arrow so that the edge pairs are retained in the Edge Store 714 by a following retain-edge step 1204. The metadata of the edges in the retained edge pairs is sent, in a following step, to the Recompression Manager 503 to be stored by a step 1205 before the process is directed to a "DONE" step 1200 and the process ends.

For retained edge pairs, the edge metadata can be used to determine the number of bytes needed to encode the edge pair, using a predetermined entropy encoding method that is to be executed by the Lossless Compressor 706. The number of bytes needed to encode each edge pair can be predicted accurately before the edge pair is entropy-encoded by the Lossless Compressor 706. The entropy encoding method and edge pair encoded size prediction is described hereinafter in detail below.

Alternatively, if the region defined by the edge pair is deemed insignificant by contrast, the process 1200 proceeds according to a "N" arrow from the step 1203 to a "calculate-size-significance" step 1201, where a region size significance metric M is calculated for edge pair assessment. The process 1200 considers the length of the edge pair in the y direction (the length of the region defined by the edge pair), stored in the edge pair data structure as edge_length, along with the maximum width of the region defined by the edge pair, stored in the edge pair data structure as max_width. These two values are added together to form the region size significance metric M for the edge pair. Typically, for an edge pair to be accepted, the value of the region size significance metric M should be greater than approximately 8-10% of the perimeter of the tile. For example, in a tile of dimensions 64 pixels by 64 pixels an acceptable threshold value of the metric M would be 20 (pixels). Accordingly, a following "check-size-significance" step 1202 determines whether the region size significance metric M for the edge pair is greater than or equal to a specified edge significance threshold ES_Threshold which is a region size threshold. If the region size significance metric M for the edge pair is determined to be greater than or equal to ES_Threshold, the edge pair is deemed to significant by size and is retained in the following "retain-edge" step 1204 after the process follows a "Y" arrow from the step 1202 to the step 1204. Then, the edge's metadata is sent by the step 1205 to the Recompression Manager 503 to be stored before the process 1200 ends. Candidate values of ES_Threshold are obtained from a memory like HDD 2110 or memory 2106.

Edge pairs that are insignificant by contrast at the check-edge-contrast step 1203 and having a region size metric M less than the ES_Theshold as assessed by the step 1202 are considered to be visually insignificant, and are given to the edge-update-mask step 1206 after the process 1200 follows a "N" arrow from the step 1202 to the step 1206. The Bit Mask Generator 707 updates the tile bitmask in the edge-update-mask step 1206 to reflect the pixel positions of the region enclosed by the visually insignificant edge pair. The edge pair data is then discarded in a following discard-edge step 1208 before the edge assessment process 1200 is directed to the "DONE" step and terminates.

Edge Metadata

Figure 19:
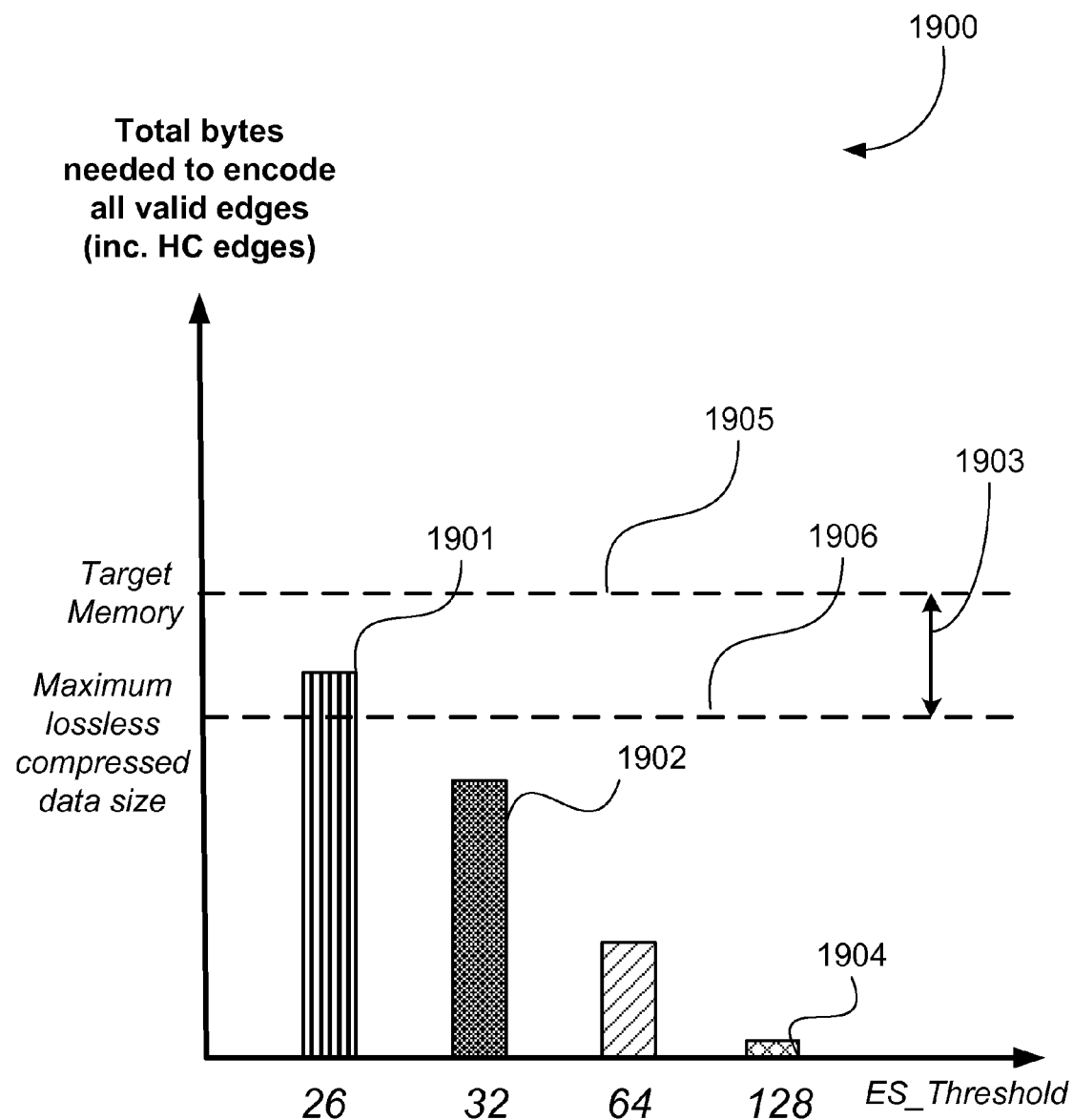
FIG. 19 shows an exemplary histogram that represents the metadata used for adjusting the edge assessment criteria.

As depicted in FIG. 19, the edge metadata can be used to map a value of the edge significance threshold ES_Threshold to the sum of the encoded data sizes for all "valid" edge pairs at that particular ES_Threshold. In particular, it is determined if the size of the region bounded by the edge pair exceeds the edge significance threshold ES_Threshold, then data amount to loslessly encode edges (edge pair) constituting the region which exceeds the edge significance threshold ES_Threshold is estimated.

In this manner the encoded data size of an edge pair using a predetermined entropy encoding method can be determined before the edge pair is entropy-encoded by the Lossless Compressor 706. The entropy encoding method is described hereinafter in more detail below.

The mapping between various candidate values of the edge significance threshold ES_Threshold and the encoding data size of all "valid" edges can be used to accurately predict the memory usage of all losslessly encoded edge pairs when adjusting the ES_Threshold value for recompression purposes.

Figure 13A:
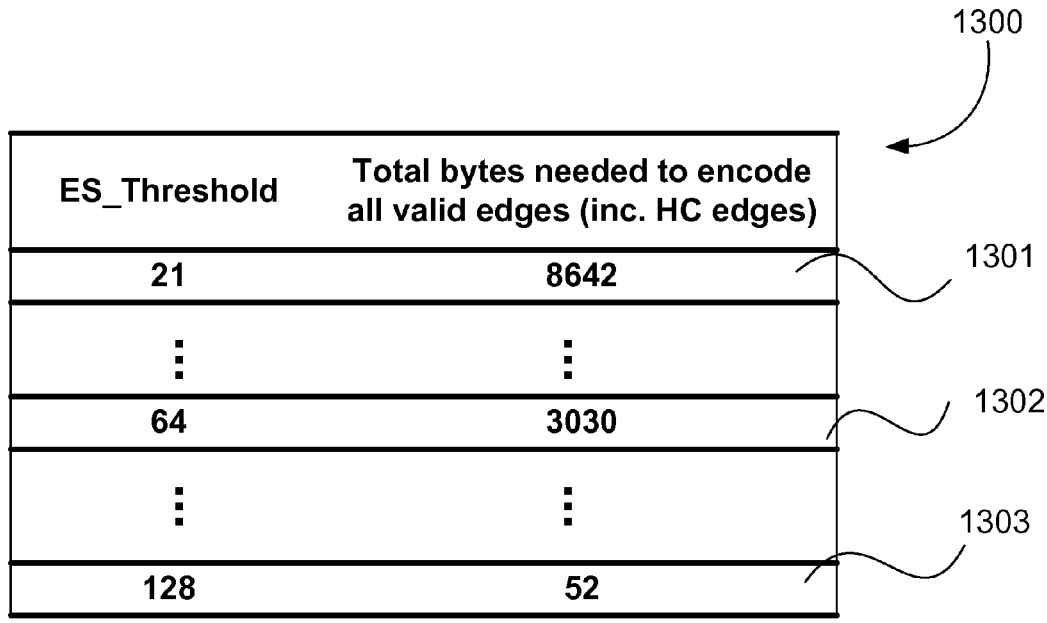
FIG. 13a is an example of one representation of how the edge metadata is stored in the Recompression Manager.

FIG. 13a shows one example of the edge metadata stored in the Recompression Manager 503, where a table 1300 is used to map each possible value of the edge significance threshold ES_Threshold to the total number of bytes needed to encode all "valid" edges, i.e. edges that are either assessed to be significant by contrast at the step 1203 or significant by size at the step 1202. The table 1300 shows examples of possible ES_Threshold values for a tile of dimensions 64 pixels by 64 pixels, where a table entry 1301 shows the minimum value of ES_Threshold above its default value 20, and a table entry 1303 shows the maximum value of ES_Threshold.

The Table 1300 does not explicitly list all candidate values of ES_Threshold stored in this example. One intermediate ES_Threshold value is also shown in a table entry 1302. As the size significance threshold ES_Threshold increases, the total encoded size for all "valid" edges decreases, due to a drop in the total number of size-significant edge pairs. Note that since edge pairs that are significant by contrast are retained in the edge assessment process 1200 regardless of their size significance metric M, the number of edge pairs that are contrast significant does not change as the value of ES_Threshold changes.

Figure 13B:
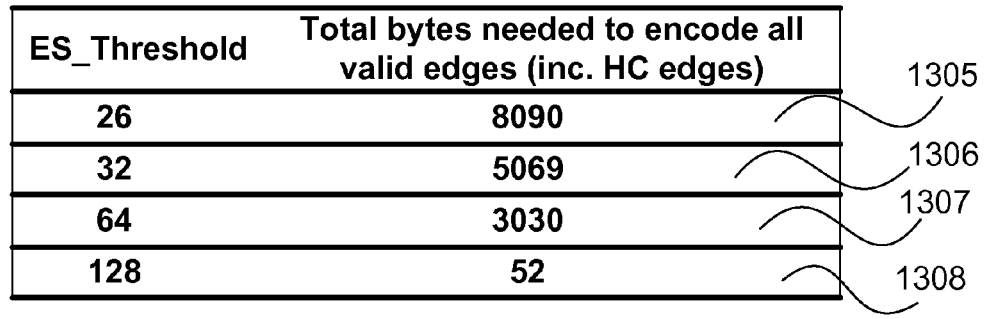

FIG. 13b shows a table 1390, which is an alternative to the table 1300, of the edge metadata stored in the Recompression Manager 503. In the table 1390, only a subset of all possible values of the edge significance threshold ES_Threshold is chosen. Each selected ES_Threshold value is mapped to the total number of bytes needed to encode all "valid" edges corresponding to that threshold. By selecting a subset of all possible values of the edge significance threshold, the storage overhead required to maintain edge metadata in the Recompression Manager 503 is reduced, as shown in the example in FIG. 13b, where the number of table entries in table 1390 is reduced compared to the number of table entries in table 1300.

Lossless Compressor

After all edge pairs have been processed by the Edge Classifier 705, the Edge Compressor 706 compresses the visually significant edge data (ie the information about the valid edge pairs) stored in the Edge Store 714 using a lossless compression method, creating a lossless data bitstream 712 that is passed to the Compressed Memory Manager 504 (FIG. 7).

Each visually significant edge pair data item consists, in the disclosed SPR arrangements, of its raw color value, (X, Y) starting positions, as well as enabling and disabling edges. The raw color values corresponding to each edge pair are written to the Compressed Data Memory Manager 504 in the same order as the edge pairs were generated in the tile. There is a one to one correspondence between the number of raw color values and the number of visually significant edge pairs.

Since the edge pairs are tile-based, a fixed number of bits can be used to encode the (X, Y) start positions. Likewise, a fixed number of bits can be used to encode the length of the edge pair in the y direction, which indicates the number of pixel runs that make up the edge pair. For example, in a tile size of 64 by 64 pixels, 6 bits are required to code each coordinate value in the start positions and length of an edge pair respectively.

The position of the enabling edge in an edge pair is encoded as a series of x-offset values, where each x-offset value represents the change in the enabling edge's x-position from the previous scan line. The disabling edge is encoded in the same manner as enabling edges. The offset data can be coded using an entropy-based encoding method similar to that used by JPEG for encoding DC coefficients. In this method, each x-offset value is represented by a symbol pair referred to as symbol-1 and symbol-2. Symbol-1 represents the number of bits in the offset value. Symbol-2 represents the offset value itself. Symbol-1 is encoded with a variable-length code, generated from a predetermined suitable Huffman table. Symbol-2 is encoded as a variable-length integer whose length in bits is represented by Symbol-1. The Huffman codes and code lengths are specified externally and are known to both the Lossless Compressor 706 and the Decompressor 711.

Since the size of Symbol-1 and Symbol-2 for any value of x-offset is known, the encoded size of an edge pair can be calculated by the Edge Classifier 705 by summing the size of symbol pairs for all x-offsets of the edge pair. The encoded size then forms part of the edge metadata sent to the Recompression Manager 503 in the step 1505.

If a tile contains only visually significant edge pairs, then the enabling edge of one flat region serves as the disabling edge of a neighbouring flat region. Therefore, only the enabling edge in each edge pair needs to be compressed by the Lossless Compressor 706, and the encoded size of an edge pair would only include the size of x-offsets from the enabling edge.

Lossy Compression and Quality Partitions

The lossy regions of a tile other than the flat regions in which edges to be compressed losslessly are compressed using a lossy compression algorithm executed by the Lossy Compressor 709 after the flat regions each of which has a uniform colour have been masked out and back-filled. JPEG is one of the most popular lossy encoding methods of bitmap images, which uses frequency domain encoding.

Figure 14A:
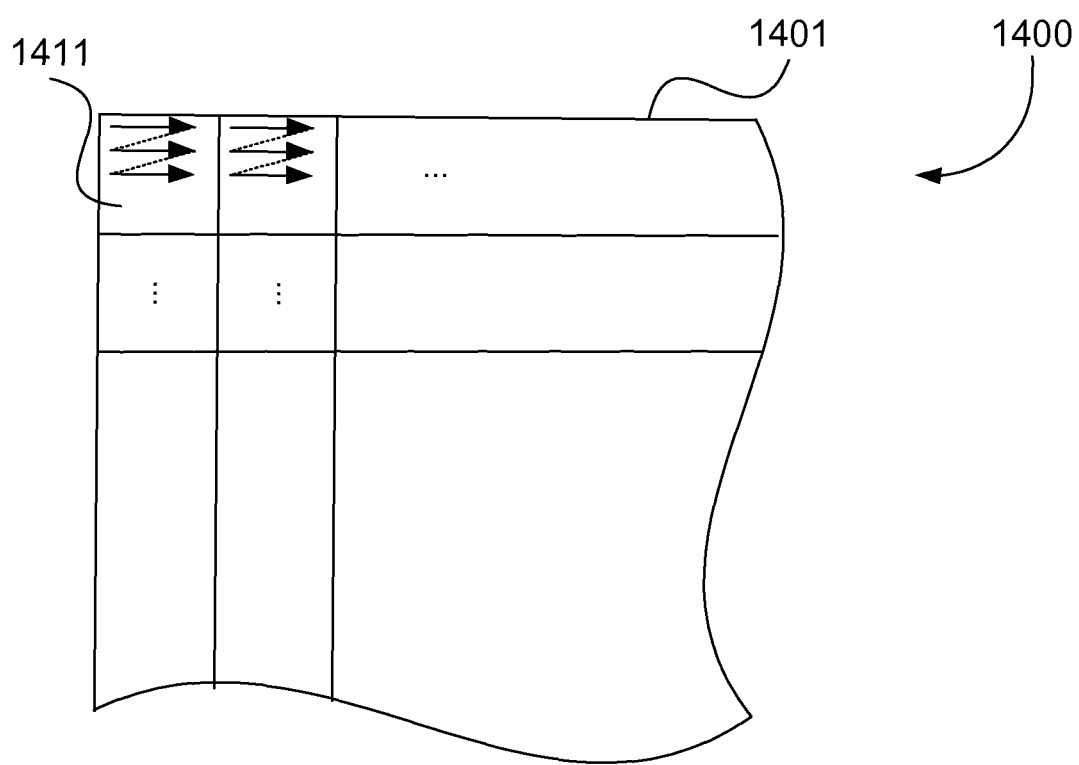
FIG. 14a is a schematic diagram of an image being divided up into coding units for lossy encoding.
Figure 14B:
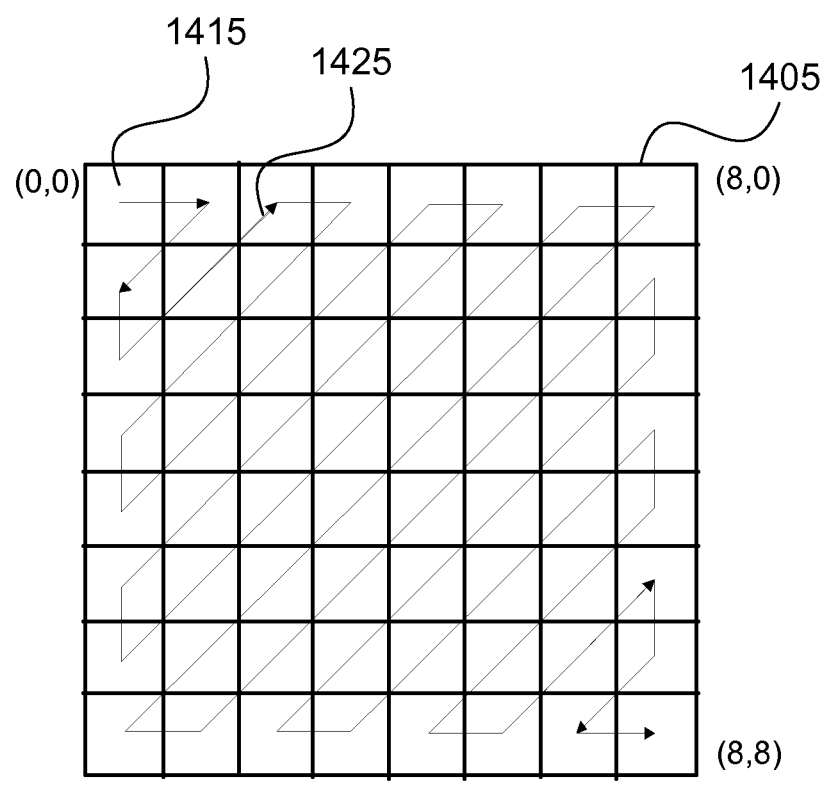
FIG. 14b is a schematic diagram of an 8 by 8 DCT block.

FIG. 14a and FIG. 14b are illustrations pertaining to this process. In particular, FIG. 14a is a schematic diagram of an image being divided up into coding units for lossy encoding, and FIG. 14b is a schematic diagram of an 8 by 8 DCT block.

During a typical JPEG compression process, a bitmap image 1401 is first divided into coding blocks 1411 of 8 by 8 pixels. A discrete cosine transform (DCT) is applied to each coding block to produce an 8 by 8 block of frequency domain coefficients 1405, with the DC coefficient 1415 located at position (0, 0) and AC coefficients arranged in a zig-zag order 1425. The higher the order of the AC coefficients, the higher the frequency of the energies they encode. In the spatial domain, high frequency energies within the image represent fast-varying values, and low frequency energies represent slow-varying gradients.

Following on from the DCT transform step, the 64 DCT coefficients are then quantised using a quantisation table. Typically, the quantisation table will quantise higher order AC coefficients to a greater degree. This is due to the fact that the higher frequency energies they encode can typically be represented with a smaller number of bits. Finally, the quantised DCT coefficients are Huffman encoded.

Figure 15:
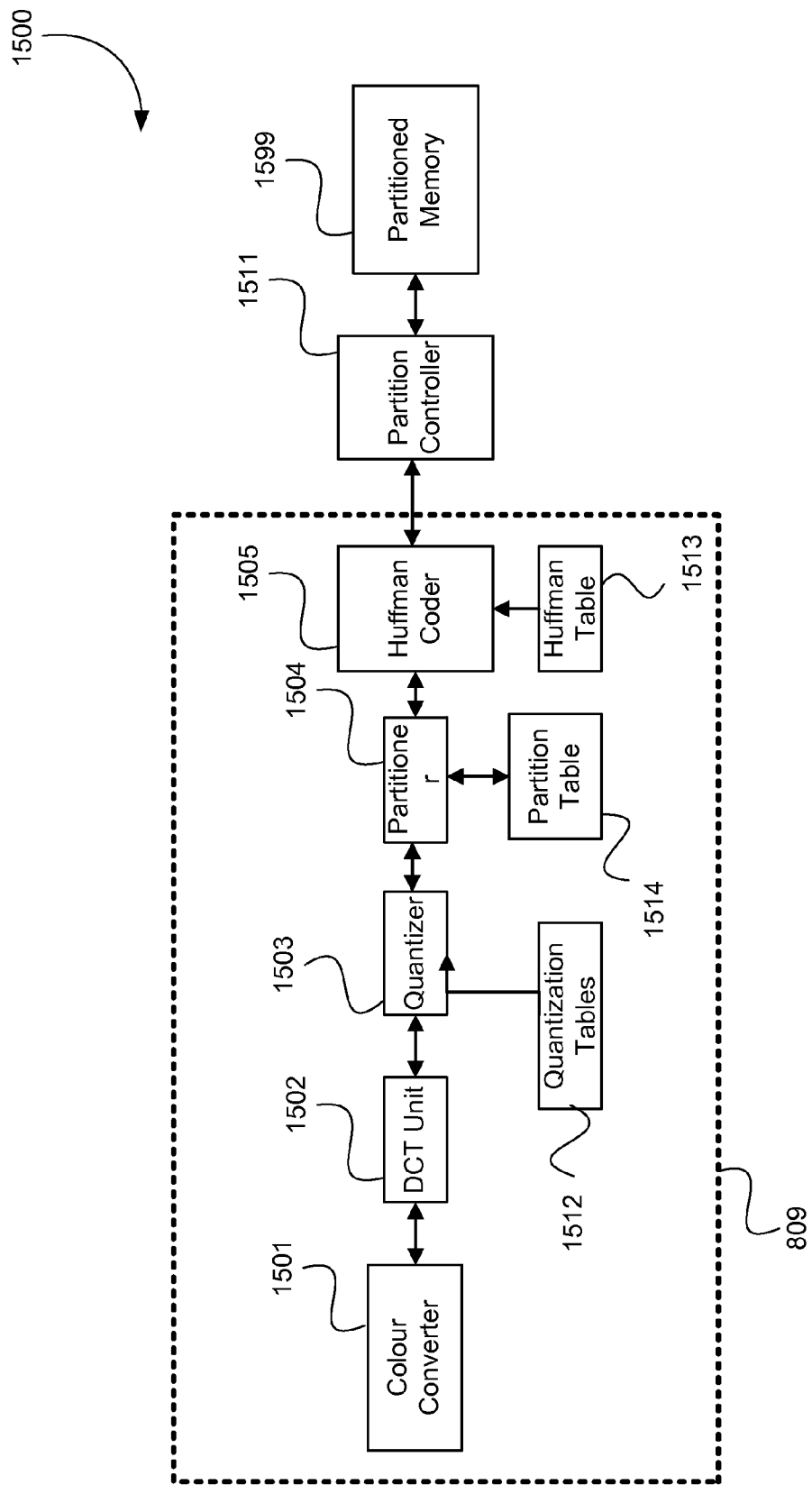
FIG. 15 is a schematic diagram showing the arrangement of an lossy image compression apparatus according to an SPR arrangement.

FIG. 15 is a functional block diagram of an example of the Lossy Compressor 709, which, implements a JPEG algorithm as described above. First, a colour converter 1501 converts input image data into the correct processing colour space if required, in this case RGB. Alternatively, input image data can also be converted to YCbCr colour space. Subsequently, a DCT unit 1502 performs a DCT for these RGB data in units of 8 by 8 blocks, outputting DCT coefficients. A quantiser 1503 quantises the 8 by 8 blocks of DCT coefficients by using a modified JPEG quantisation table 1512, thereby outputting quantised coefficients. The quantiser 1503 also rearranges the 8 by 8 blocks of quantised coefficients into 64 one-dimensional quantised coefficients from lower-frequency components to higher-frequency components in accordance with a scan in a zigzag order as shown in FIG. 14.

The quantised coefficients are then divided by a partitioner 1504 into quality partitions according to a partition table 1514, and the partitioner 1504 supplies the quality partitions to a Huffman coder 1505, which encodes the input one-dimensional data in the quality partitions using a Huffman table 1513 and a standard known Huffman encoding technique. The outputs from the Huffman coder are the coded data, the length ("code length" represented by the number of bits) of each coded data, and a number (to be referred to as a "partition number" hereinafter) representing a partition to which the corresponding coded data is assigned.

A Partition Controller 1511 is part of the Compressed Memory Manager 504 and controls the size of the final coded image by discarding the image's DCT coefficients, starting from the highest order coefficient and stopping once the memory target is met. This is because the majority of the visual information in the image is encoded within the DC and lower AC coefficients.

Figures 16A, 16B:
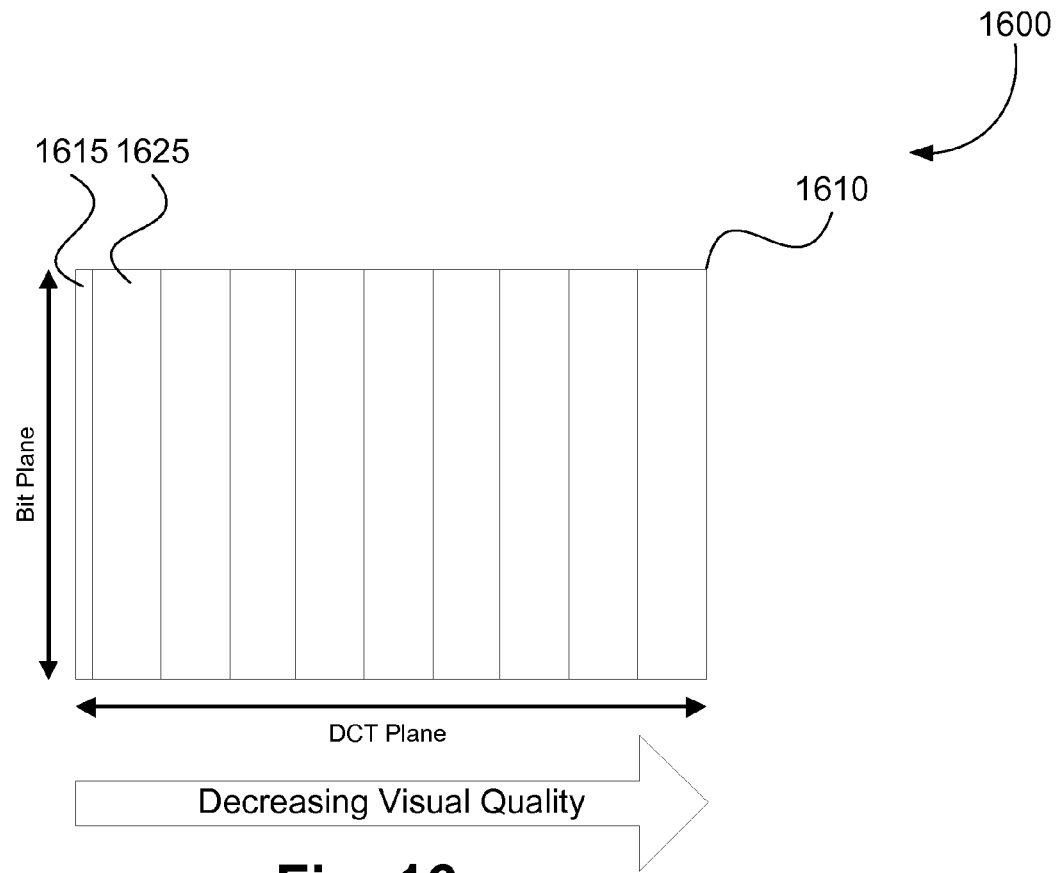
FIG. 16a is a schematic diagram of the quality partitions in the DCT domain.
FIG. 16b is a table showing an exemplary partitioning scheme for the encode DCT coefficients.

FIG. 16a and FIG. 16b depict a method for spectral JPEG encoding of images. For each DCT coding block, the quantised coefficients are stored within spectral bands of decreasing visual quality. The increasing order of the DCT coefficients is directly related to their decreasing impact on the visual quality of the image. Hence the DCT coefficients can be grouped into spectral partitions that are sorted by decreasing relevance to the overall image quality. In this arrangement, the image quality can be degraded gradually through the deletion of the higher spectral partitions and their associated DCT coefficients.

FIG. 16a shows a partitioning example of the DCT data 1610 for a coding block, with partitions 2 and 3 shown as 1615 and 1625.

FIG. 16b is a table showing an exemplary partitioning scheme. In a SPR arrangement, partition 1 is reserved for lossless encoding data of the edge pairs.

On the basis of the "partition number", which is determined by the Compressed Memory Manager 504, the partition controller 1511 writes compressed data, corresponding to a partition indicated by the "partition number", into a compression memory 1599. This compression memory is configured into partitions (see FIG. 20), and each piece of encoded data is written in a partition corresponding to the partition number of that data.

Example of Edge Assessment and Region Classification

Figure 17:
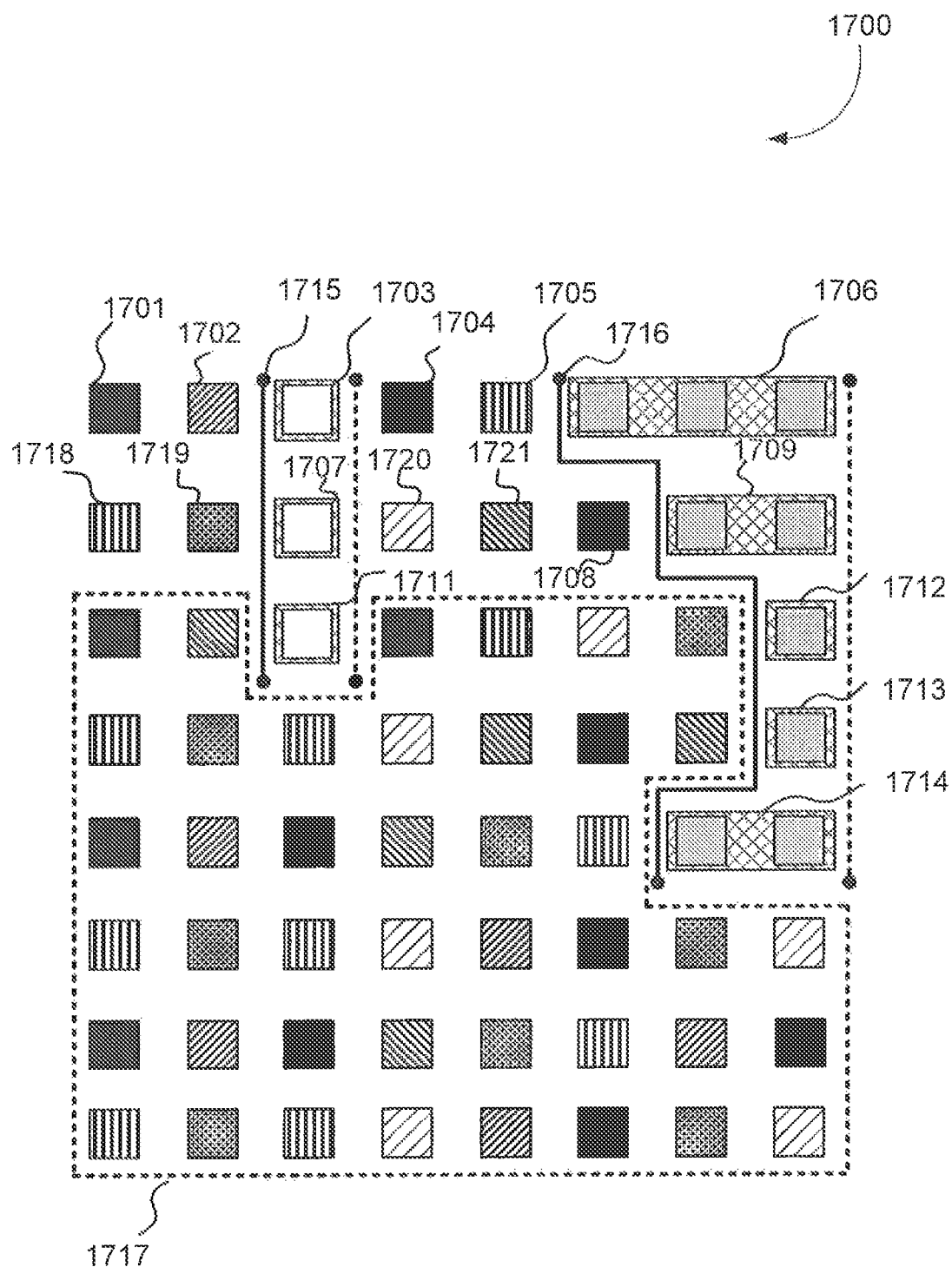
FIG. 17 shows an example tile compressed by an SPR arrangement.

FIG. 17 shows an example of a tile that is hybridly compressed according to the SPR arrangement. An eight pixel by eight pixel tile 1700 is shown. For the purposes of this example, the Hybrid Compressor/Decompressor 502 utilises an ES_Threshold value of 3. The Pixel Run Generator 701 generates six pixel runs 1701 to 1706 for a first scanline. The Edge generation process 1100 receives each pixel run and generates an active edge pair accordingly for each pixel run. No edges pairs are assessed during processing of the first scanline since all edges are still active. For simplicity, only the edge pairs 1715 and 1716 for the pixel runs 1703 and 1706 respectively are shown in FIG. 17.

At the second scanline, a pixel run 1707 extends the active edge pair 1715 started by the pixel run 1703. The x-offset value for both the enabling and disabling edges of the active edge pair 1715 on the second scanline is 0. The pixel runs 1718, 1719, 1720, 1721, and 1708 on the second scanline begin new active edges because they cannot extend edges pairs from the first scanline. After the pixel run 1708 is processed by the edge generation process 1100, the edge pairs formed by the pixel runs 1701, 1702, 1704 and 1705 are all resolved by the edge generation process 1100 since they can no longer be continued. Each of these resolved edges have low contrast in regard to the specified contrast threshold CT_Threshold, and has a size significance metric M of 2. So in the edge assessment process 1100, the four edge pairs formed by pixel runs 1701, 1702, 1704 and 1705 are discarded. The Pixel run 1709 extends the edge pair 1716 started by the pixel run 1706 to include the pixel run 1709. The x-offset value for the enabling and disabling edges for the edge pair 1716 on the second scanline is +1 and 0 respectively.

The edge generation process 1100 continues for the rest of the tile. The edge pair 1716 is extended with pixel runs 1712, 1713 and 1714. The edge pair 1715 is extended with pixel runs 1711. The remaining pixels, depicted by 1717, are judged to be part of the image region and their corresponding edge pairs are discarded.

After all edge pairs have been classified, the tile 1700 is compressed using (a) the Lossless Compressor 706 to compress the edge pairs 1715 and 1716, and (b) the Lossy Compressor 709 to compress the rest of the tile with the flat regions masked out and back-filled with colours of nearby pixels, e.g. pixels 1704, 1705 and 1708.

Strategic Memory Reduction

Referring to FIG. 5 and FIG. 6, after an initial pass of compression in the step 602 has been executed by the Hybrid Compressor/Decompressor 502, control is passed to the Compressed Memory Manager 504, where the step 604 is carried out to determine if further action needs to be taken to reduce the compressed data size in order to meet the memory target. If so, the strategic memory reduction step 603 is executed, which is explained hereinafter in more detail in regard to the schematic flowchart in FIG. 18.

Figure 18:
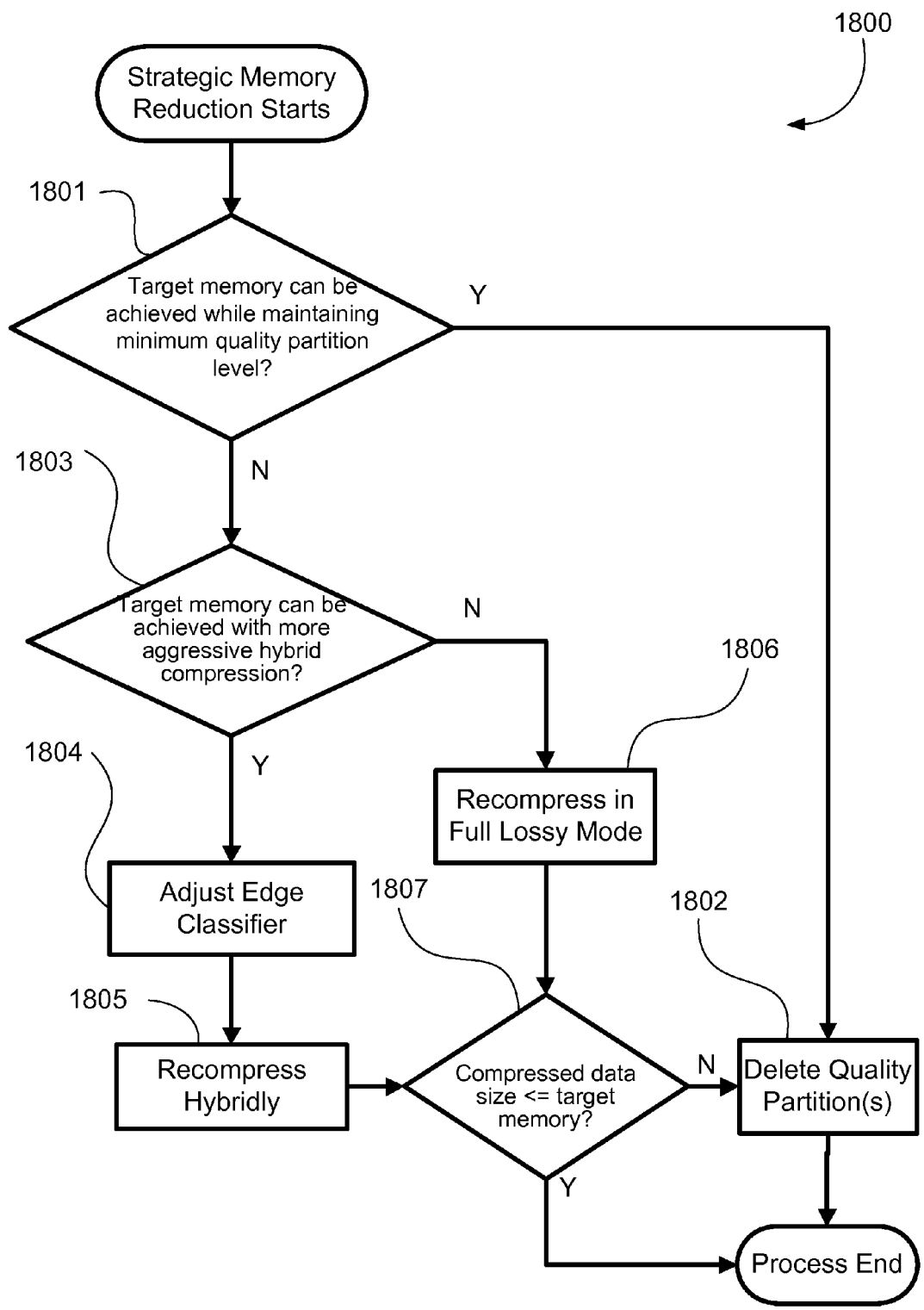
FIG. 18 is a schematic flow diagram showing the strategic memory reduction step depicted in FIG. 6.

FIG. 18 is a schematic flow diagram showing the strategic memory reduction step depicted in FIG. 6. The strategic memory reduction process 1800 is triggered by a decision made by the Compressed Memory Manager 504 to reduce the amount of the compressed data. In a step 1801, the Compressed Memory Manager 504 examines the data sizes of the quality partitions of the lossily compressed image data, and determines the minimum memory usage if the number of partitions retained is above a predetermined minimum quality level. The minimum quality level needs to be maintained in order to avoid noticeable visual artefacts in the regions of the lossily compressed image data. This step is performed before edge assessment process in FIG. 12 (for example, edge contrast determination step 1203 or region size determination step 1201). If the given memory target can be reached by retaining at least the number of quality partitions needed to maintain the minimum quality level, then a following step 1802 will be executed by the Compressed Memory Manager 504 after the process 1800 follows a "Y" arrow from the step 1801 to the step 1803. The step 1802 removes quality partitions one by one, starting from the partition that holds the least visually significant data, till the memory requirement is met.

However, simply removing the least visually significant quality partitions alone may not reduce the memory usage sufficiently, i.e., a minimum quality level may not be achievable under the constraint of the target memory limit. This scenario may arise especially when only a small part of the data is compressed lossily in the initial hybrid compression process, and the majority of the data is compressed losslessly, where progressive quality partition deletion cannot be used. In order to maintain the optimal balance between memory usage and image quality, a strategy of shifting data from lossless regions to the lossy regions in the process of recompression is employed.

If the Compressed Memory Manager 504 determines the in the step 1801 that the target memory cannot be achieved while maintaining the minimum quality level in step 1801, then it passes control to the Recompression Manager 503 and instructs it to recompress the image. The Recompression Manager 503 then determines, in a following step 1803 after the process 1800 follows a "N" arrow from the step 1801 to the step 1803, the best recompression modes based on the edge metadata it collected from the Edge Classifier 705 during the initial hybrid compression pass. The Recompression Manager 503 chooses between (a) recompression in hybrid mode with a more aggressive edge significance threshold ES_Threshold so that more image data can be classified as lossy regions, and (b) recompression in full lossy mode, which by-passes the edge generation and classification process and only uses the Lossy Compressor 709. In either case, the recompression will reduce the compressed data size in the lossless region. Either all data (in the case of full lossy recompression) or a sufficient portion of the image data will be compressed lossily so that the memory requirement can be satisfied by deleting quality partitions progressively.

Since data recompression is computationally intensive, it is advantageous to determine the appropriate recompression mode that guarantees that the resulting compressed data meets the memory requirement in one pass, with optimal image quality. In order to do that, the Recompression Manager 503 needs to determine if a suitable value for the edge significance threshold ES_Threshold can be found in the step 1803, to ensure sufficient reduction in memory usage of the losslessly compressed data. If there is such a threshold value, then the Recompression Manager 503 adjusts the edge significance threshold in a following step 1804, after the process 1800 follows a "Y" arrow from the step 1803 to the step 1804, and then initiates the hybrid recompression in a following step 1805. If not, a full lossy recompression process 1806 is initiated after the process 1800 follows a "N" arrow from the step 1803 to the step 1806. In the disclosed arrangement, the lossy compression algorithm is the same lossy algorithm used as part of the hybrid compression.

The process of selecting a suitable value from a plurality of candidate values for the edge significance threshold ES_Threshold is described hereinafter in further detail with reference to FIG. 19.

FIG. 19 shows an exemplary histogram that represents the metadata used for adjusting the edge assessment criteria. The histogram 1900 is an alternative view of the exemplary metadata table 1390 collected by the Recompression Manager 503, in which the x-axis shows the range of valid ES_Threshold (region size threshold) to show the candidate values for this particular example and the y-axis indicates the total number of bytes needed to encode losslessly all valid edges which satisfy each ES_Threshold. An example of a memory requirement is marked by a dashed horizontal line 1905 to indicate the data size of the target memory. The maximum lossless compressed data size 1906 is also referred to as the target recompression size. The maximum lossless compressed data size 1906 as a memory requirement is determined by subtracting the amount of memory to store lossily compressed image data at the predetermined minimum quality partition level 1903 from the pre-determined target memory size (or memory capacity) 1905.

In this particular example, each estimated data amounts (the total bytes to encode all valid edges satisfying ES_Threshold is compared with the maximum lossless compressed data size 1906 as a memory requirement. It can be seen that the total bytes to encode all valid edges satisfying an ES_Threshold with a value of 26 (ie reference numeral 1901) is unable to meet the memory requirement at the minimum quality level. Therefore the next qualifying value 32 is selected as the new value for the edge significance threshold ES_Threshold. The total bytes to encode all valid edges corresponding to the selected value for the edge significance threshold ES_Threshold is the closest to the Maximum lossless compressed data size 1906 and within the maximum lossless compressed data size 1906 as a memory requirement. Because the total bytes to encode all valid edges can keep the highest image quality as well as can meet the Maximum lossless compressed data size 1906. The new ES_Threshold is passed into the Edge Classifier 705 in the step 1804 before the recompression process begins.

If there is no suitable value of ES_Threshold to be selected, ie, in the event that the maximum lossless compressed data size allowed 1906 is less than the lossless encoding size at maximum ES_Threshold value, then the full lossy recompression step 1806 is chosen by the Recompression Manager 503 in the step 1803, which will result in a zero encoding size for lossless data.

Returning now to FIG. 18, at either the step 1805 or the step 1806, a recompression process is performed, in which the compressed data is first decompressed tile by tile. After each tile of data is decompressed by the Decompressor 711, a compression process is performed on the tile data using the compression mode chosen at the step 1803 by the Recompression Manager 503. If a hybrid recompression mode is selected, then the compression process is similar to the initial hybrid compression 602, with exception that a new value for the edge significance threshold ES_Threshold is used for classifying edges. In particular, edges constituting the region which satisfies the selected value of the region size threshold is compressed losslessly. Also, image data in a region other than the region to be compressed losslessly is compressed lossily If a full lossy recompression is selected, then the compression process is simplified, viz., instead of sending the tile data to the Pixel Run Generator 701, decompressed tile data is sent directly to the Lossy Compressor 709 for full lossy compression.

After the recompression process is finished, the Compressed Memory Manager 504 compares the compressed data size with the memory requirement at a following step 1807. If the compressed data size is less than or equal to the target memory limit, the strategic memory reduction process terminates after the process 1800 follows a "Y" arrow to an END step. If however the compressed data size is greater than the target memory limit required, the Compressed Memory Manager 504 receives an indication of this fact and frees memory at a step 1802, after the process 1800 follows a "N" arrow from the step 1807 to the step 1802, by deleting quality partitions starting from the partition with the lowest quality until the target memory limit is met. In this way the image quality of the final output is controllably degraded only as much as required to satisfy the target memory limit. Once the target memory limit requirement is met, the strategic memory reduction process terminates.

Partition Arrangement

Figure 20A:
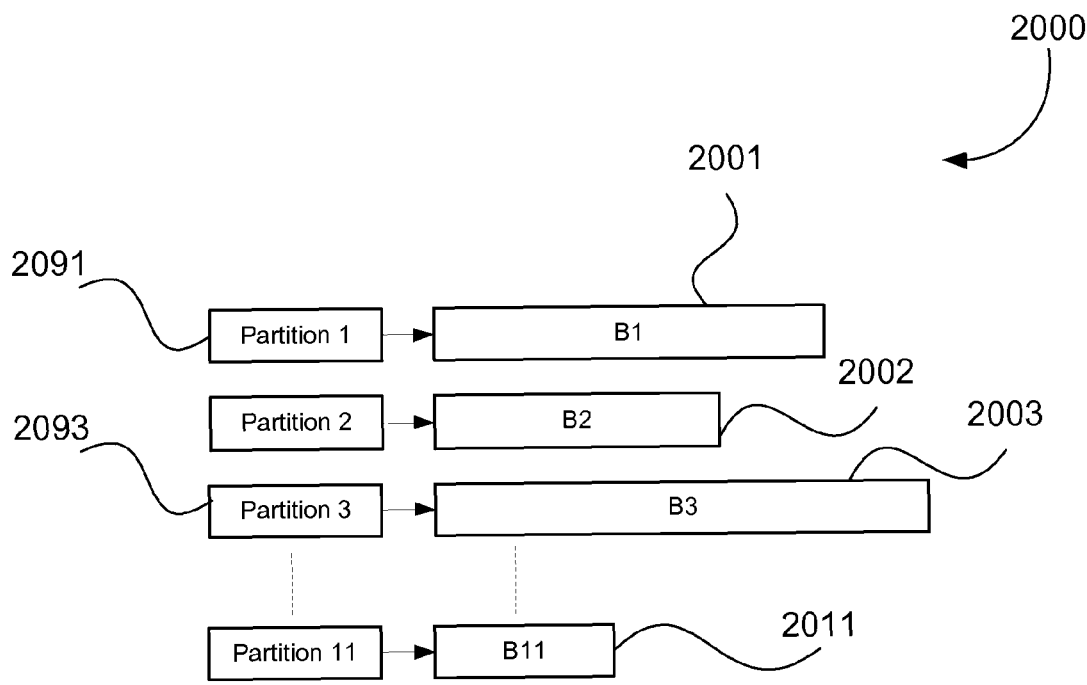
FIG. 20a is a schematic diagram of a method of storing the quality partitions within memory after initial compression.
Figure 20B:
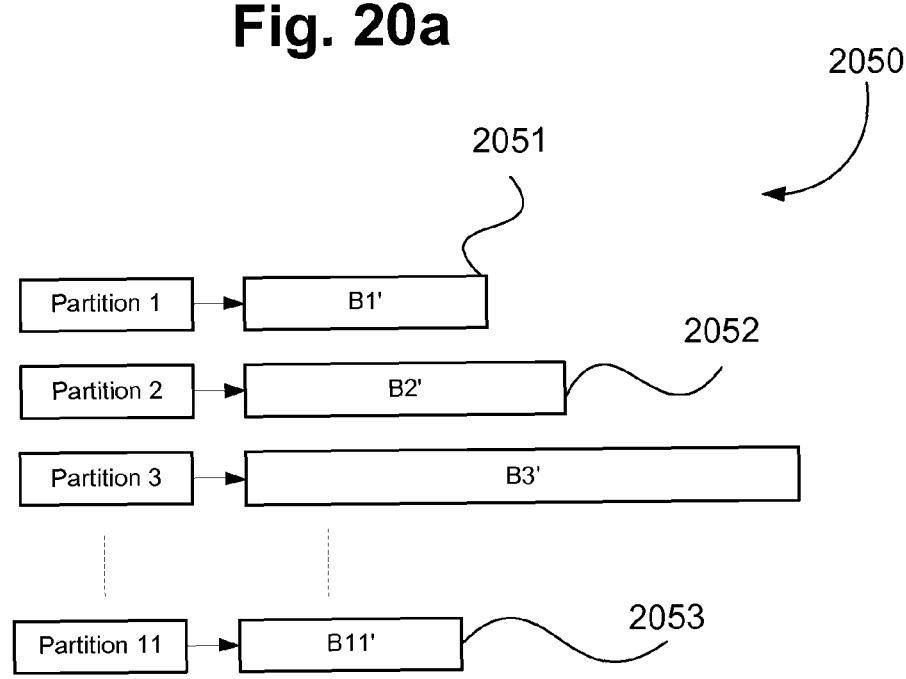
FIG. 20b is a schematic diagram of a method of storing the quality partitions within memory after recompression.

FIGS. 20*a* and 20*b* show an example of quality partitions and how recompression is used to shift information between partitions so that the progressive quality reduction is possible when further memory usage reduction is needed.

FIG. 20*a* shows a schematic diagram of an example of a partition arrangement after the initial compression process 602. FIG. 20*b* shows a schematic diagram of an example of a partition arrangement during the strategic memory reduction process 603 in which a hybrid recompression 1805 has taken place.

According to the SPR arrangement, the Compressed Memory Manager 504 arranges the memory containing the compressed image into a plurality of headers and memory chunks. Each memory chunk corresponds to a particular quality partition header. The partition headers store partition information such as the partition number, the length (ie size) of the partition, the method to access the associated memory chunk, or other additional information as needed. For the purposes of the present disclosure a "memory chunk" refers to one or more blocks of, not necessarily contiguous, memory linked together to form a logically contiguous chunk of memory for the purpose of storing compressed image data. In this example, a chunk 2001 corresponds to a partition 1 header 2091, while a chunk 2003 corresponds to a partition 3 header 2093.

In this example, during the initial compression process 602, the Compressed Memory Manager 504 organises the quality partitions such that all losslessly encoded edges produced by the Lossless Compressor 706 are stored in the memory chunk B1 that belongs to partition 1 (ie 2001), while the encoded DCT data produced by the Lossy Compressor 709 is stored in each partition within its respective memory chunk from partition 2 (ie 2002) to partition 11 (ie 2011). An exemplary mapping between the partition number and its corresponding DCT data is shown in FIG. 16*b*.

FIG. 20*b* shows a partition arrangement resulting from the hybrid recompression step 1805. During hybrid recompression by the step 1805, the Compressed Memory Manager 504 frees all the memory chunks from 2001 to 2011 as the image is decompressed. Memory is reallocated to store the new encoded data as the recompression step 1805 progresses. During the example of hybrid recompression, the Compressed Memory Manager 504 allocates the memory chunk B1' (ie 2051) for partition 1 to store newly encoded edge data from the Lossless Compressor 706. However, the size of the memory chunk B1' needed to store the recompressed edge data is much smaller than the original size of the memory chunk B1 (ie 2001) that was used to store encoded edge data from the initial hybrid compression 602. This is due to the edge significance threshold ES_Threshold being adjusted in the step 1804 before the hybrid recompression, leading to a reduction in the number of valid edges, the reduced number of valid edges being referred to as adjusted valid edges or adjusted valid edge pairs. The effect of reducing the number of losslessly encoded edges is however the potential size increase in the partitions that store encoded DCT data from the Lossy Compressor 709 by virtue of the correspondingly increased number of invalid edges, referred to as adjusted invalid edges or adjusted invalid edge pairs. As shown in this example, the memory chunk B2' (ie 2052) allocated for partition 2, which is used to store the encoded DC values of the lossy regions, is now slightly bigger than the original size of the memory chunk B2 (ie 2002) before the hybrid recompression. Similarly, all lossy partitions from partition 3 to partition 11, could potentially gain a bit more memory usage due to the increase in the number of the lossy regions. The reduction in memory utilisation by the lossless encoding can exceed the increase in memory utilisation by the lossy encoding. Furthermore, as shown in this example, by shifting more edges to be compressed lossily, more memory can be released by deleting partitions with visually less significant DCT data, less memory is required to store the losslessly encoded edges and the more significant DCT data in the lower partitions, so that the target memory limit requirement can be achieved without significant deterioration of the image quality.

Under extremely constrained memory conditions, the strategic memory reduction process 603 will choose to recompress an image in full lossy mode in the step 1806. In this case, partition 1 has zero size, and all image data is encoded in partition 2 to partition 11, which can then be deleted progressively in step 1802 till the memory requirement is met.

INDUSTRIAL APPLICABILITY

The arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The invention claimed is:

1. A method of compressing an image to be stored in a memory to satisfy a memory requirement, executed by at least one processor, said method comprising the steps of:
   determining a size of a region in the image, the region having a uniform colour;
   obtaining candidate values of a region size threshold;
   comparing the determined size of the region with at least one of the candidate values of the region size threshold;
   estimating data amounts to encode edges constituting the region which satisfy the at least one of the candidate values of the region size threshold;
   selecting a value from the candidate values as the region size threshold based on the comparison between the estimated data amounts and the memory requirement;
   compressing losslessly edges constituting the region which satisfy the selected value of the region size threshold; and
   compressing lossily image data in a region other than the region to be compressed losslessly.

2. A method according to claim 1, wherein the region is defined by the edge pair and the size of the region is determined based on the sum of length of the edge pair and maximum width of the edge pair.

3. A method according to claim 1, wherein the memory requirement is defined by subtracting the amount memory to store lossily compressed image data at a predetermined quality level from a predetermined memory target size.

4. A method according to claim 1, wherein the selected value from the candidate value corresponds to an estimated data amount which is the closest to the memory requirement and satisfies the memory requirement.

5. A method according to claim 1, wherein the region whose size is determined does not satisfy a predetermined contrast threshold.

6. A method according to claim 1, further comprising steps of determining if the number of partitions which is retained in lossily compressed image data stored in the memory is above a predetermined minimum quality level before the size of a region is determined, and deleting a partition with the lowest quality to satisfy the memory target.

7. A method of compressing an image to be stored in a memory to satisfy a memory requirement, executed by at least one processor, said method comprising the steps of:
   obtaining one of candidate values of a size of a region to be compressed in a first way, the region having a uniform colour in the image;
   estimating a data amount of compressed data to be obtained by compression in the first way of regions in the image which satisfy the one of the candidate values;
   selecting a value of a size of region from the candidate values based on the estimation and the memory requirement; and
   compressing in the first way a region of the image which satisfies the selected value, and compressing in a second way a region of the image which does not satisfy the selected value, wherein the compression in the first way is less lossy than the compression in the second way.

8. A method according to claim 7, wherein the estimating step comprises:
   determining regions whose each edge size exceeds the one of the candidate values;
   estimating a data amount of compressed data of the determined regions if the determined regions are compressed in the first way.

9. An apparatus for compressing an image to be stored in a memory to meet a memory capacity, the apparatus comprising:
   a processor; and
   a memory storing a computer executable program configured to direct the processor to effect a method comprising the steps of:
   determining a size of a region in the image, the region having a uniform colour;
   obtaining candidate values of a region size threshold;
   comparing the determined size of the region with at least one of the candidate values of the region size threshold;
   estimating data amounts to encode edges constituting the region which satisfies the at least one of the candidate values of the region size threshold;
   selecting a value from the candidate values as the region size threshold based on the comparison between the estimated data amounts and the memory requirement;
   compressing losslessly edges constituting the region which satisfies the selected value of the region size threshold; and
   compressing lossily image data in a region other than the region to be compressed losslessly.

10. An apparatus for compressing an image to be stored in a memory to satisfy a memory requirement, said apparatus comprising:
    a processor; and
    a memory storing a computer executable program configured to direct the processor to effect a method comprising the steps of:
    obtaining one of candidate values of a size of a region to be compressed in a first way, the region having a uniform colour in the image;
    estimating a data amount of compressed data to be obtained by compression in the first way of regions in the image which satisfy the one of the candidate values;

selecting a value of a size of region from the candidate values based on the estimation and the memory requirement; and compressing in the first way a region of the image which satisfies the selected value, and compressing in a second way a region of the image which does not satisfy the selected value, wherein the compression in the first way is less lossy than the compression in the second way.

11. An apparatus according to claim 10, wherein the program is further configured to direct the processor to execute the steps of:

determining regions whose each edge size exceeds the one of the candidate values; and estimating a data amount of compressed data of the determined regions if the determined regions are compressed in the first way.

12. A computer readable non-transitory storage medium storing a computer executable program configured to a processor to effect a method of compressing an image to be stored in a memory to satisfy a memory requirement, said method comprising the steps of:

determining a size of a region in the image, the region having a uniform colour;

obtaining candidate values of a region size threshold;

comparing the determined size of the region with at least one of the candidate values of the region size threshold;

estimating data amounts to encode edges constituting the region which satisfies the at least one of the candidate values of the region size threshold;

selecting a value from the candidate values as the region size threshold based on the comparison between the estimated data amounts and the memory requirement;

compressing losslessly edges constituting the region which satisfies the selected value of the region size threshold; and compressing lossily image data in a region other than the region to be compressed losslessly.

13. A computer readable non-transitory storage medium according to claim 12, wherein the region is defined by the edge pair and the size of the region is determined based on the sum of length of the edge pair and maximum width of the edge pair.

14. A computer readable non-transitory storage medium according to claim 12, wherein the memory requirement is defined by subtracting the amount memory to store lossily compressed image data at a predetermined quality level from a predetermined memory target size.

15. A computer readable non-transitory storage medium according to claim 12, wherein the selected value from the candidate value corresponds to an estimated data amount which is the closest to the memory requirement and satisfies the memory requirement.

16. A computer readable non-transitory storage medium according to claim 12, wherein the region whose size is determined does not satisfy a predetermined contrast threshold.

17. A computer readable non-transitory storage medium according to claim 12, further comprising steps of determining if the number of partitions which is retained in lossily compressed image data stored in the memory is above a predetermined minimum quality level before the size of a region is determined, and deleting a partition with the lowest quality to satisfy the memory target.

18. A computer readable non-transitory storage medium storing a computer executable program configured to a processor to effect a method of compressing an image to be stored in a memory to satisfy a memory requirement, said method comprising the steps:

obtaining one of candidate values of a size of a region to be compressed in a first way, the region having a uniform colour in the image;

estimating a data amount of compressed data to be obtained by compression in the first way of regions in the image which satisfy the one of the candidate values;

selecting a value of a size of region from the candidate values based on the estimation and the memory requirement; and compressing in the first way a region of the image which satisfies the selected value, and compressing in a second way a region of the image which does not satisfy the selected value, wherein the compression in the first way is less lossy than the compression in the second way.

19. A computer readable non-transitory storage medium according to claim 18, wherein the program is further configured to direct the processor to execute the steps of:

determining regions whose each edge size exceeds the one of the candidate values; and estimating a data amount of compressed data of the determined regions if the determined regions are compressed in the first way.

20. A method of compressing an image to be stored in a memory to satisfy a memory requirement, executed by at least one processor, said method comprising:

determining a size of a region in the image, the region having a uniform colour;

identifying a value of a region size threshold based on an amount of compressed data to be obtained by compression of regions in the image which satisfy said value of the region size threshold; and compressing, in a first way, edges constituting the region which satisfies the identified value of the region size threshold; and compressing, in a second way, a region of the image which does not satisfy the identified value of the region size threshold, wherein the compression in the first way is less lossy than the compression in the second way.

* * * * *